(12) United States Patent
Lyzen et al.

(10) Patent No.: US 12,296,898 B2
(45) Date of Patent: May 13, 2025

(54) JOGWHEEL DEVICE AND POWERED FEEDBACK AND CASTER EFFECT FOR DRIVE-BY-WIRE JOGWHEEL DESIGN

(71) Applicant: MTD PRODUCTS INC, Valley City, OH (US)

(72) Inventors: Zachary A. Lyzen, Seattle, WA (US); Adam J. Woodrum, Wakeman, OH (US); Adam Hiller, Jeromesville, OH (US); Jay E. Maggard, Polk, OH (US)

(73) Assignee: MTD PRODUCTS INC, Valley City, OH (US)

( * ) Notice: Subject to any disclaimer, the term of this patent is extended or adjusted under 35 U.S.C. 154(b) by 309 days.

(21) Appl. No.: 17/736,141

(22) Filed: May 4, 2022

(65) Prior Publication Data

US 2022/0363306 A1    Nov. 17, 2022

Related U.S. Application Data

(60) Provisional application No. 63/312,910, filed on Feb. 23, 2022, provisional application No. 63/183,939, filed on May 4, 2021.

(51) Int. Cl.
*B62D 5/00* (2006.01)
*A01D 101/00* (2006.01)
(Continued)

(52) U.S. Cl.
CPC ............... *B62D 5/006* (2013.01); *B62D 1/02* (2013.01); *B62D 5/046* (2013.01); *A01D 2101/00* (2013.01)

(58) Field of Classification Search
CPC .......... B62D 5/006; B62D 5/046; B62D 1/02
(Continued)

(56) References Cited

U.S. PATENT DOCUMENTS 10,196,122 B1 *   2/2019   Andrasko .............. B63H 25/02
12,030,607 B1 *   7/2024   Kirchhoff .............. B63B 79/10
(Continued)

FOREIGN PATENT DOCUMENTS

DE          19951379 A1    5/2001
EP           2583880 A1    4/2013
(Continued)

OTHER PUBLICATIONS

English translation of WO 2020002204 A1, obtained via EspaceNet (Year: 2024).*
(Continued)

*Primary Examiner* — Krishnan Ramesh
(74) *Attorney, Agent, or Firm* — Wegman Hessler Valore

(57) ABSTRACT

A drive-by-wire steering system for a power equipment device is provided. One example embodiment comprises a steering interface system, a power steering system, and a communication link connecting the steering interface system and power steering system. The power steering system can adjust steering angle of wheels of the power equipment device based on inputs received from the steering interface system. The steering interface system can receive user inputs and provide powered feedback and/or a simulated caster effect via a steering interface. Additional embodiments include power equipment devices and steering interface systems.

24 Claims, 13 Drawing Sheets

(51) Int. Cl.
*B62D 1/02* (2006.01)
*B62D 5/04* (2006.01)

(58) Field of Classification Search
USPC .......................................................... 701/36
See application file for complete search history.

(56) References Cited

U.S. PATENT DOCUMENTS

| | | | | |
|---|---|---|---|---|
| 2001/0042655 | A1* | 11/2001 | Dammeyer | B66F 9/07568 |
| | | | | 280/443 |
| 2003/0141137 | A1* | 7/2003 | Menjak | B62D 5/006 |
| | | | | 180/402 |
| 2005/0082107 | A1* | 4/2005 | Husain | B62D 5/006 |
| | | | | 180/402 |
| 2019/0092373 | A1* | 3/2019 | Nofzinger | B62D 5/006 |
| 2019/0389504 | A1* | 12/2019 | Itoh | B62D 5/0484 |
| 2021/0016769 | A1* | 1/2021 | Mitsumoto | B62D 6/04 |
| 2021/0114651 | A1* | 4/2021 | Wilson-Jones | B62D 15/0225 |
| 2022/0332331 | A1* | 10/2022 | Ming | B60R 16/033 |

FOREIGN PATENT DOCUMENTS

| | | | | |
|---|---|---|---|---|
| EP | 3098194 | A1 | 11/2016 | |
| EP | 3696053 | A1 | 8/2020 | |
| WO | WO-2020002204 | A1 * | 1/2020 | ........... B62D 5/0469 |

OTHER PUBLICATIONS

International Search Report and Written opinion for Application No. PCT/US2022/027591, dated Aug. 25, 2022.

\* cited by examiner

JOGWHEEL DEVICE AND POWERED FEEDBACK AND CASTER EFFECT FOR DRIVE-BY-WIRE JOGWHEEL DESIGN

CROSS REFERENCE TO RELATED APPLICATIONS

This application claims the benefit of U.S. Provisional Application No. 63/183,939 filed May 4, 2021 and U.S. Provisional Application No. 63/312,910 filed Feb. 23, 2022, the entireties of which are hereby incorporated by reference. The following are hereby incorporated by reference within the present disclosure in their respective entireties and for all purposes: U.S. Provisional Patent Application No. 63/183,939 filed May 4, 2021, U.S. patent application Ser. No. 17/016,022 filed Sep. 9, 2020; U.S. Pat. No. 9,409,596 issued Aug. 9, 2016; and U.S. Pat. No. 9,944,316 issued Apr. 17, 2018.

FIELD OF DISCLOSURE

The disclosed subject matter pertains to apparatuses and methods for drive-by-wire steering interface for power equipment, for instance, which can provide powered feedback and/or simulate a caster effect to improve drivability.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly, from sporting events requiring moderately precise turf, such as soccer fields or baseball outfields, to events requiring very high-precision surfaces such as golf course greens, tennis courts and the like.

Drive-by-wire technology employs electrical or electrical-mechanical linkages to connect vehicle functions instead of mechanical linkages, allowing control of a vehicle via electronic control systems instead of mechanical controls. Various types of drive-by-wire systems have been developed in connection with road vehicles. While road vehicles have particular challenges, including those arising from the greater speeds and traffic involved, extension of drive-by-wire technology to off-road equipment often presents different challenges.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

A first example embodiment is a drive-by-wire steering system for a power equipment machine, comprising: a steering interface system comprising: a steering interface configured to receive rotational input from a user; a steering interface position encoder configured to determine a control angular displacement of the steering interface relative to a center angle of the steering interface; a steering interface motor configured to rotate the steering interface; and a steering interface motor controller configured to control activation of the steering interface motor to apply one or more torques to the steering interface; a power steering system comprising: one or more steerable wheels; a steering position encoder configured to determine a wheel angular displacement of the one or more steerable wheels relative to a center angle of the one or more steerable wheels; one or more steering motors configured to turn the one or more steerable wheels; one or more steering motor controllers configured to control activation of the one or more steering motors to turn the one or more steerable wheels toward a target wheel angular displacement, wherein the target wheel angular displacement is the control angular displacement divided by a steering ratio, wherein the steering interface system and the power steering system communicate via a communication link, wherein the communication link is one of a wired communication link or a wireless communication link.

A second example embodiment is a steering interface system, comprising: a steering interface configured to receive rotational input from a user; a steering interface position encoder configured to determine a control angular displacement of the steering interface relative to a center angle of the steering interface; a steering interface motor configured to rotate the steering interface; a steering interface motor controller configured to control activation of the steering interface motor to apply one or more torques to the steering interface; and a communication interface configured to output first data that indicates the control angular displacement and receive second data that indicates a wheel angular displacement.

A third example embodiment is a power equipment machine, comprising: a steering interface system comprising: a steering interface configured to receive rotational input from a user; a steering interface position encoder configured to determine a control angular displacement of the steering interface relative to a center angle of the steering interface; a steering interface motor configured to rotate the steering interface; and a steering interface motor controller configured to control activation of the steering interface motor to apply one or more torques to the steering interface; a power steering system comprising: one or more steering elements configured to control a heading of the power equipment machine; one or more heading controllers configured to determine the heading of the power equipment machine relative to a center angle of the heading; one or more steering motors configured to cause the one or more steering elements to change the heading; one or more steering motor controllers configured to control activation of the one or more steering motors to cause the one or more steering elements to change the heading to a target heading, wherein the target heading is determined based on the control angular displacement and a steering ratio; and a Controller Area Network (CAN) bus that facilitates communication between the steering interface system and the power steering system.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
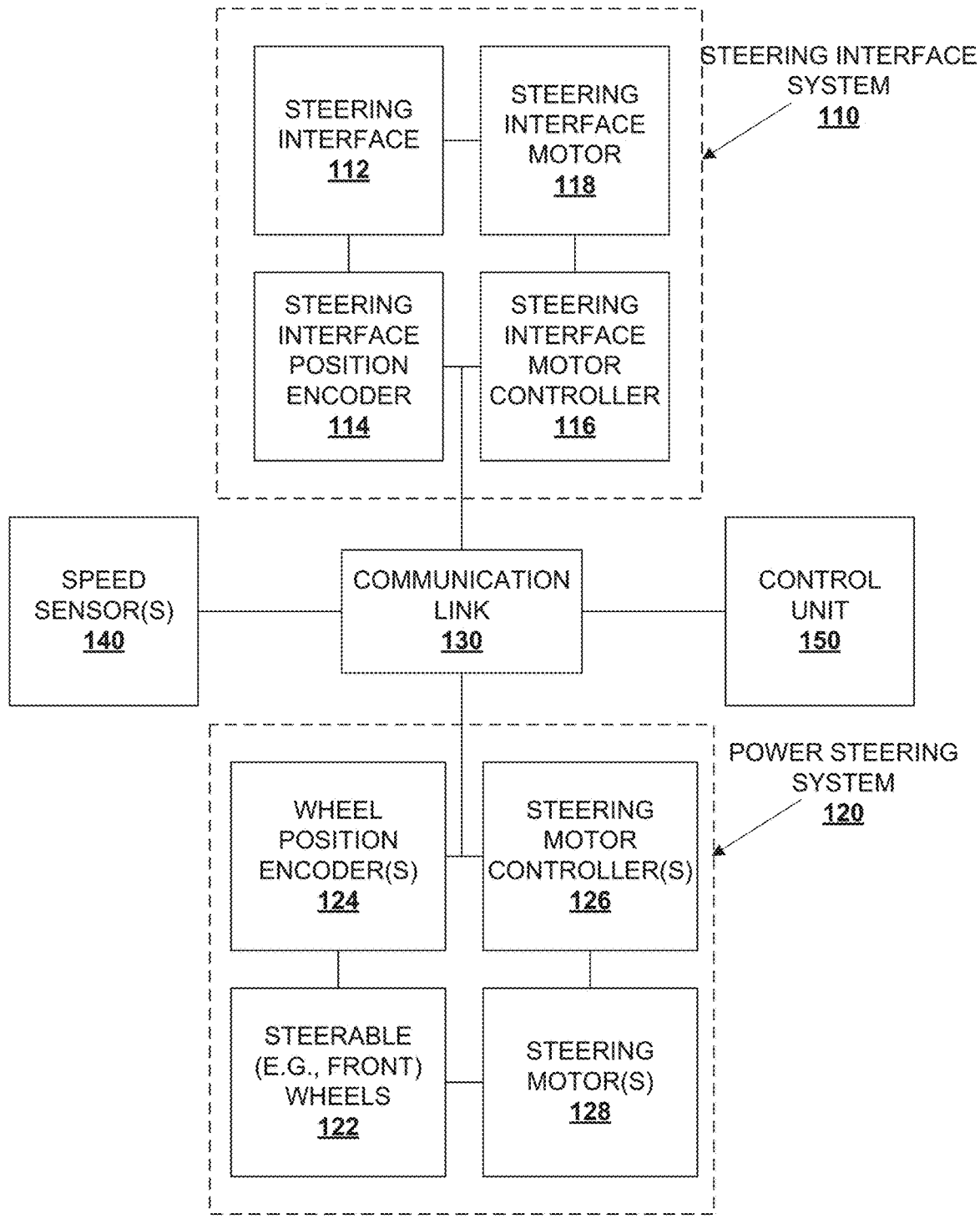
FIG. 1 depicts a block diagram of an example drive-by-wire steering system for a power equipment machine, according to various aspects discussed herein.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to providing user feedback and enhanced drivability in drive-by-wire systems for power equipment machines are described herein, it should be understood that the disclosed machines, electronic and computing devices and methods are not so limited and modifications may be made without departing from the scope of the present disclosure. The scope of the systems, methods, and electronic and computing devices for providing user feedback and enhanced drivability in drive-by-wire systems are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of manually operated, robotic, partially robotic ride-on, walk-behind, sulky equipped, autonomous, semi-autonomous (e.g., user-assisted automation), remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

Referring to FIG. 1, illustrated is a diagram of an example drive-by wire steering system 100 for a power equipment machine, according to one or more embodiments of the present disclosure. Drive-by-wire steering system 100 can be employed in or in connection with any suitable power equipment machine disclosed herein or known in the art, such as one or more power equipment machine(s) discussed herein.

Drive-by-wire steering system can comprise a steering interface system 110 and power steering system 120 that communicate via a communication link 130, and can optionally comprise one or more of communication link 130 (e.g., when it is a wired communication link), speed sensor(s) 140 and a control unit 150.

Steering interface system 110 can receive user inputs (e.g., for controlling steering of the power equipment machine, etc.) and angular position data from power steering system 120, and can provide resistive torque and other feedback (e.g., haptic, etc.) to the user, which can be based on information received from power steering system 120, speed sensor(s) 140, and/or control unit 150. In various embodiments, steering interface system 110 can comprise a steering interface 112 (e.g., jogwheel, steering wheel, lap bars, etc.), steering interface position encoder 114 (e.g., which can receive signals indicating a position or angular position and/or change thereof from one or more sensors or systems, such as the example Hall effect sensor discussed below, etc.), steering interface motor controller 116, and steering interface motor 118, each of which is discussed in greater detail below, as well as a communication interface (not shown) for communication over communication link 130, and an electrical power system (e.g., a battery, an alternator, a generator, or the like) and/or an electrical connection to an electrical power system (e.g., of the power equipment machine, etc.) for providing power to other elements of steering interface system 110 (also not shown).

Power steering system 120 can monitor an angular position of one or more steerable wheels (e.g., front wheels, etc.) 122 of the power equipment machine, can provide angular position data for the wheel(s) to steering interface system 110 and/or control unit 150, and can control the angular position of the wheel(s) (or otherwise control power steering system 120 to obtain a given heading, depending on the embodiment, as discussed in greater detail below) based on inputs from steering interface system 110 and/or control unit 150. Power steering system 120 can comprise the steerable wheel(s) 122, wheel position encoder(s) for the steerable wheels 122 (e.g., which can receive signals indicating an angular position and/or change thereof from one or more sensors or systems, such as the example Hall effect sensor discussed below, etc.), steering motor controller(s) 126, and steering motor(s) 128, each of which is discussed in greater detail below, as well as a communication interface (not shown) for communication over communication link 130, and an electrical power system (e.g., a battery, an alternator, a generator, or the like) and/or an electrical connection to an electrical power system (e.g., of the power equipment machine) for providing power to other elements of steering system 120 (also not shown).

Communication link 130 can facilitate communication between other components of system 100, and depending on the embodiment, communication link 130 can be a wired communication link (e.g., a bus such as a Controller Area Network (CAN) bus, etc.) and/or wireless communication link (e.g., any suitable public, private or commercial cellular voice or data network (second generation (2G), 3G, 4G, WiMAX, 4G long term evolution (LTE), 5G, and so forth), a satellite voice or data network, Bluetooth®, or Wi-Fi technology IEEE 802.11(a, b, g, n, . . . ), infrared, Ultra-Wideband (UWB), etc.). In embodiments employing a wired communication link 130 (and in some embodiments employing a wireless communication link 130), system 100 can be wholly comprised within the power equipment machine. In other embodiments employing a wireless communication link 130, power steering system 120, speed sensor(s) 140 (when included), and optionally control unit 150 (when included) can be comprised with the power equipment machine, while steering interface system 110 and optionally control unit 150 (when included) can be comprised within a separate device for remote control of the power equipment machine.

In embodiments that comprise speed sensor(s) 140, speed sensor(s) can monitor a speed (e.g., ground speed) of the power equipment machine (e.g., via rear wheel(s), etc.), and can provide speed data to steering interface system 110 and/or control unit 150. Additionally or alternatively, ground speed can be determined based on external data, such as location data received from a communication network or global positioning system (GPS) (e.g., which can include similar and/or related techniques, such as GPS with Real Time Kinematics (GPS-RTK)), etc., and can similarly be provided to steering interface system 110 and/or control unit 150.

In embodiments that comprise control unit 150, control unit 150 can receive angular position data from power steering system 120 and optionally location or other data (e.g., external data from a communication network or GPS, internal data from ground speed or machine vision sensors, etc.) used for an autonomous or semi-automomous mode, and can control power steering system 120 based on an autonomous or semi-autonomous driving mode (e.g., autonomous turning such as autonomous u-turns, etc.). Additionally, in some embodiments, control unit 150 can receive information from steering interface system 110, power steering system 120, and/or speed sensor(s) 140 and coordinate operation of system 100 according to a manual mode as discussed in greater detail herein.

In various embodiments, drive-by-wire steering system 100 can provide powered feedback to a user of the power equipment machine and/or simulate the effect of a positive caster angle (independent of any actual positive, zero, or negative caster angle) on the steerable wheel(s) 122 of the power equipment machine, as described in greater detail below.

Steering interface 112 can be a rotational input/output device (e.g., such as the jogwheel illustrated in the figures and discussed in greater detail below, a steering wheel, lap bars, etc.) that can be rotated clockwise or counterclockwise by a user and/or steering interface motor 118 as driven by steering interface motor controller 116 according to various aspects discussed herein (in other embodiments, analogous techniques can be employed with translational input devices). Steering interface 112 can have a center angular position that can be defined (and in some scenarios redefined, as discussed herein) to be associated with a center angle of steerable wheel(s) 122. The center angle of steerable wheel(s) 122 is the angle such that power equipment machine will drive straight while the steerable wheel(s) 122 are at the center angle of steerable wheel(s) 122. Rotation of steering interface 112 can be measured and monitored by steering interface position encoder 114, such that steering interface position encoder 114 can store an angular displacement of steering interface 112 relative to the center angular position of steering interface 112, and steering interface position encoder 114 can periodically output that angular displacement over communication link 130.

Steering interface motor 118 can be configured to rotate (or apply braking to) steering interface 112 as driven by steering interface motor controller 116 according to aspects discussed herein. Steering interface motor 118 can apply torque to steering interface 112 via driving or braking applied via steering interface motor controller 116 to achieve one or more effects discussed herein, including resistive torque for one or more of: simulation of a caster effect, powered feedback, haptic feedback to a user, etc.

Rotation of steerable wheels 122 can be measured and monitored by wheel position encoder(s) 124, such that wheel position encoder(s) 124 can store an angular displacement of steerable wheel(s) 122 relative to the center angle of steerable wheel(s) 122, and wheel position encoder(s) 124 can periodically output the angular displacement over communication link 130.

Steering motor (s) 128 can be driven by steering motor controller(s) 126 to rotate steerable wheel(s) 122. Steering motor(s) 128 can apply torque to steerable wheel(s) 122 via motor activation or braking by steering motor controller(s) 126 to rotate steerable wheel(s) based on inputs received from steering interface system 110 and/or control unit 150. One or more torques can be applied (separately or in any applicable combination) in various scenarios, as discussed below.

Additionally, while many embodiments employ physically steerable wheel(s) that change a physical axis of rotation of those steerable wheel(s) to change a direction of motion of the power equipment machine, other types of steering systems can be employed. As a first non-limiting example, in some power equipment devices, steering can be controlled by separate motors that can apply different speeds on a pair of drive wheels, tracks, etc. to rotate one drive wheel, track, etc. faster than the other, inducing a turn about the slower driven wheel, track, etc., and vice versa. As a second non-limiting example, some power equipment devices are capable of rotating two or more steerable wheels into non-parallel planes to turn the power equipment machine along an intended heading (e.g., zero turn power equipment machines, etc.). Accordingly, while for ease of illustration, the physical angle of steerable wheels is discussed as one embodiment, more generally, the extent to which the heading of a power equipment machine will curve can correspond to the wheel angle or wheel angular position as discussed in the above embodiment (where a center angle can be any arrangement of power steering system 120 such that there is no curvature, such as the same drive speed on all drive wheels, etc.), and the power steering system 120 can control that heading (e.g., by varying drive speeds of wheels, independently varying angles of two or more steerable wheels, etc., to achieve a given turn) to correspond to the input from steering interface 112 similarly to the specific embodiment discussed herein.

In response to a control angular displacement of steering interface 112 (e.g., via user input), which can be communicated by steering interface position encoder 114, wheel position encoder(s) 124 can instruct steering motor controller(s) 126 to drive steering motor(s) 128 to align steerable wheel(s) 122 with a corresponding wheel angular displacement (if not already aligned). In various embodiments, a control angular displacement of steering interface 112 can correspond with a wheel angular displacement of steerable wheel(s) 122 based on a given steering ratio R (e.g., 6, 3-12, etc.). For example, for a steering ratio of six, a given control angular displacement will be a factor of six greater than the corresponding wheel angular displacement (e.g., a 60° clockwise control angular displacement will correspond to a 10° clockwise wheel angular displacement). In various embodiments, a default steering ratio can be employed, and in some embodiments, a user can alter or select the steering ratio (e.g., when the power equipment machine is in a parked state, off, etc.). In the same or other embodiments, the steering ratio can change based on a speed of the outdoor power equipment (e.g., a higher ratio at higher speeds, etc.).

As a first scenario in which a torque can be applied to steering interface 112, in various embodiments, steering interface motor 118 can be driven to apply a first resistive torque to steering interface 112, which can be a small baseline resistive torque with a constant magnitude (e.g., 0.5 in-lb, 0.25-0.75 in-lb, etc.) applied in opposition to user inputs. In various embodiments, a default baseline resistive torque can be employed, and in some embodiments, a user can alter or select the baseline resistive torque (e.g., when the power equipment machine is in a parked state, off, etc.). Applying at least some resistive torque to steering interface 112 can improve drivability by reducing potential oversteering that can result from steering interface 112 turning too easily. In some scenarios (e.g., during autonomous driving or turning, etc.), steering interface motor controller 116 can apply braking to instead of driving steering interface motor 118, which can provide resistive torque in appropriate scenarios when there is no current user input.

Because steering interface 112 is not connected to steerable wheel(s) 122 via a mechanical linkage, it is possible for a user to rotate steering interface 112 to a control angular displacement that corresponds to a wheel angular displacement beyond the range of motion of steerable wheel(s) 122 (as an example, for a steering ratio of 6 and a maximum wheel angular displacement of 110°, a control angular displacement greater than 660° (e.g., 720°) would correspond to a wheel angular displacement beyond the maximum wheel angular displacement, e.g., past wheel lock). As a second scenario in which a torque can be applied to steering interface 112, in various embodiments, steering interface motor 118 can be driven to apply a second resistive torque to steering interface 112 to oppose user input(s) that would rotate steering interface 112 to an angular displacement corresponding to a wheel angular displacement beyond the range of motion of steerable wheel(s) 122. The second torque can give a user a better feel of when steerable wheel(s) 122 are (or are about to be) at wheel lock. This second resistive torque can be greater than the first resistive torque, and in various embodiments can have a magnitude greater than 5 in-lb (e.g., 5-10 in-lb, 6-8 in-lb, etc.). Additionally, in some embodiments, the second resistive torque can be applied in a reduced form that increases from an initial value (e.g., zero, 0.5 in-lb, etc.) at a threshold wheel angular displacement to its maximum value at a maximum wheel angular displacement (e.g., linearly, with some polynomial dependence, etc.). In some embodiments, the threshold wheel angular displacement can be within 5° of the maximum wheel angular displacement (e.g., 0°, 1°, 2°, 3°, 4°, 5°, etc.). In various embodiments, a default maximum second resistive torque and/or threshold angular displacement can be employed, and in some embodiments, a user can alter or select these values (e.g., when the power equipment machine is in a parked state, off, etc.).

As discussed above in connection with the second torque, a user can continue to rotate steering interface 112 past a control angular displacement that corresponds to a maximum wheel angular displacement of steerable wheel(s) 122 (e.g., wheel lock). In various embodiments, such additional rotation in the same direction can be ignored as input (e.g., by steering interface position encoder 114, etc.), such that, regardless of any further rotation in that direction, the center angle of steering interface 112 is redefined such that the current angular position of steering interface 112 corresponds to the maximum wheel angular displacement of steerable wheel(s) 122 (e.g., wheel lock), and any rotation in the opposite direction can result in rotating steerable wheel (s) 122 in the opposite direction, without the need for the user to first undo all of the excess rotation. Continuing from the example discussed above, with a steering ratio of 6 and wheel lock at 110°, rotation of steering interface 112 in a given direction (e.g., clockwise) by 660° or any greater amount (e.g., 720°, 1080°, etc.) will result in steering interface 112 being regarded as having an angular displacement of 660° clockwise (corresponding to wheel lock), and any subsequent counterclockwise rotation will cause steerable wheel(s) to be rotated counterclockwise (e.g., a subsequent 660° counterclockwise rotation of steering interface 112 will return steerable wheel(s) to their center angle).

In some scenarios, a user can rotate steering interface 112 faster than steering motor(s) 128 can be driven to rotate steerable wheel(s) 122 to track that user input. As a third scenario in which a torque can be applied to steering interface 112, a third resistive torque can be applied (e.g., by steering interface motor 118) to align steering interface 112 with a control angular displacement that corresponds to the wheel angular displacement of the steerable wheel(s) 122 (e.g., which can be based on the steering ratio, such that, for example, for a steering ratio of R and wheel angular displacement of 45° counterclockwise from center, the torque would be applied to align steering interface 112 with an angular displacement of R×45° counterclockwise from its center angle, etc.). In various embodiments, this resistive torque can increase with an increasing difference between the current control angular displacement and the control angular displacement corresponding to the current wheel angular displacement, and/or can be applied only when that difference exceeds a threshold value (e.g., 1-4° of wheel angular displacement, etc.). Because the third torque will be applied to steerable wheel(s) 122 to attempt to align the wheel angular displacement to correspond to the current control angular displacement, this resistive torque will arise in scenarios in which steering interface 112 is rotated faster than steering wheel(s) 122 are turned by steering motor(s) 128. Thus, this resistive torque can provide feedback to a user to indicate that they are attempting to steer more rapidly than power steering system 120 is capable, simulating some of the feedback available in steering systems employing mechanical linkages instead of drive-by-wire. In various embodiments, values for the third resistive torque can range between those for the first and second resistive torques, depending on the magnitude of the difference between the current control angular displacement and the control angular displacement corresponding to the current wheel angular displacement. Additionally, in various embodiments, a default maximum third resistive torque and/or threshold difference can be employed, and in some embodiments, a user can alter or select these values (e.g., when the power equipment machine is in a parked state, off, etc.).

Caster angle is the angular offset of a steering axis from vertical when viewed from the side of the wheel. Most automobiles have a positive caster, where the steering axis, if extended beyond the wheel, will intersect the ground in front of the contact patch of the tire. Positive caster can improve directional stability via the caster effect, which provides a torque that pushes the front wheels of the automobile toward their center angle and increases with speed. Unlike automobiles, many power equipment machines do not have a positive caster, and thus do not have a caster effect.

As a fourth scenario in which a torque can be applied to steering interface 112, in various embodiments, steering interface motor 118 can be driven to apply a simulated caster effect to steering interface 112 as a fourth torque that acts to restore steering interface 112 to its center angle. In various embodiments, the simulated caster effect torque can have a magnitude that increases with one or more of angular displacement of the steering interface 112 and/or speed of the power equipment machine (e.g., based on speed data received from speed sensor(s) 140). The intensity of the simulated caster effect torque can vary between embodiments (and potentially be selectable by a user), but in many embodiments can have a maximum value below that of the second torque (e.g., for normal operation, a value could be selected such that it will return steering input 112 to its center angle (and thus return steerable wheel(s) 122 to center) absent any user input, but can be readily offset in part or entirely with moderate friction applied by the user to steering input 112, etc.). Additionally, unlike a true caster effect, the simulated caster effect torque has greater flexibility in how it can depend on angular displacement and/or speed (e.g., linearly, with some polynomial dependence, etc.). Various embodiments can apply at least a minimum value for the simulated caster effect torque (e.g., the minimum value can be applied in situations in which at least some simulated caster effect torque is applied, such as situations where both the control angular displacement and ground speed are non-zero, but not applied when the simulated caster effect torque would be zero, etc.) when the steerable wheel(s) are not at their center angle, which can ensure the steerable wheel(s) 122 return to their center angle relatively quickly absent user input to maintain a turn (or absent an autonomous or semi-autonomous turn, as discussed below). In various embodiments, a default simulated caster effect torque can be employed based on various parameters (e.g., intensity, speed dependence, angular displacement dependence), and in some embodiments, a user can alter or select these values or between different preset options for the simulated caster effect (e.g., when the power equipment machine is in a parked state, off, etc.).

In some embodiments, system 100 can be employed on a power equipment machine capable of autonomous or semi-autonomous driving (e.g., executing an autonomous u-turn, etc.), such as discussed in greater detail below. During autonomous and semi-autonomous driving, control unit 150 can control operation of steering interface motor 128 via steering motor controller(s) 126 without user input. In such scenarios, steering interface motor controller 116 can suspend any driving of steering interface motor 118 to provide resistive torque and/or a simulated caster effect to steering interface 112. Instead, steering interface motor controller 116 can apply braking via steering interface motor 118 to steering interface 112 to prevent accidental turning (e.g., caused by vibration of the power equipment machine, etc.) and provide resistance to potential user input. In various embodiments, while the power equipment machine is operating autonomously or semi-autonomously, sufficient user input via steering interface 112 (e.g., rotation by more than a threshold angular displacement) can end the autonomous or semi-autonomous mode and return the power equipment machine to a manual mode.

When the power equipment machine is returned to a manual mode from an autonomous or semi-autonomous mode (e.g., upon finishing executing an autonomous u-turn, based on user input, etc.), the previously defined center angle of steering interface 112 can be redefined such that the current control angular displacement of steering interface 112 can correspond to the current wheel angular displacement of steerable wheel(s) 122. As an example, assuming a steering ratio of 6, if steering interface 112 and steerable wheel(s) 122 had no angular displacements (were at their center angles) when entering an autonomous or semi-autonomous mode, but manual mode was resumed when the steerable wheel(s) 122 had a 15° counterclockwise angular displacement, the center angle of steering interface 112 would be redefined such that its position upon entering manual mode was a 90° counterclockwise angular displacement (i.e., the control angular displacement corresponding to the wheel angular displacement).

In some scenarios, the redefinition of the center angle of steering interface 112 can involve different torque(s) being applied to steering interface 112 by steering interface motor 118, even though steering interface 112 may not have been physically rotated between entering and exiting the autonomous or semi-autonomous mode. As one example, a user can rotate steering interface 112 to a control angular displacement corresponding to a maximum wheel angular displacement of steerable wheel(s) 122, and steering interface motor 118 can be driven to apply, for example, the first, second, and fourth torques discussed above. Next, the user can activate an autonomous u-turn mode, at which point steering interface motor controller 116 can apply braking via steering interface motor 118 to steering interface 112 to prevent accidental rotation. As the power equipment machine completes the autonomous u-turn and returns to manual mode, steerable wheel(s) 122 can be at their center angle, and the center angle of steering interface 112 can be redefined to be its current angular position. Because steering interface 112 is now at its center angle, steering interface motor controller 116 can skip applying the second and fourth torques, even though they were applied prior to the autonomous u-turn when steering interface 112 was at the same physical position, because that position has a new meaning based on the redefined center angle.

The torques discussed above can be applied to steering interface 112 to provide multiple advantages in terms of improving drivability of a power equipment machine, such as simulating the feedback available in steering systems that employ mechanical linkages and improving directional stability.

Additionally, in various embodiments, steering interface motor 118 can be driven to provide haptic feedback to a user via steering interface 112 in various scenarios. The haptic feedback can take various forms, such as a simulated detent, vibration, click, jump, tap, etc. Haptic feedback can be provided via steering interface 112 in a variety of scenarios, such as a return to manual control (or a return to manual control that is not a result of user input), gain or loss of a GPS or other location data signal, low fuel and/or power, or other alerts, including to draw user attention to an alert indicated via another output device (e.g., an indicator light, a display screen, etc.).

As discussed above, some embodiments can provide for user customization of features or parameters. This can be accomplished via a configuration mode that can be made available to a user, for example, when the power equipment machine is in park, turned off, etc. In the configuration mode, steering interface 112 (and/or other user input devices) can be used to navigate a user interface and/or select options, instead of controlling steerable wheel(s) 122, as discussed above. Haptic feedback, as discussed above, can also be provided in the configuration mode, such as to provide feedback in response to user selection of options, etc.

Although FIG. 1 provides one example embodiment steered via one or more steerable wheels, in various embodiments, the power steering system can comprise one or more steering elements (e.g., steerable wheel(s) 122, other wheels, tracks, etc.) that can be driven by steering motor(s) 128 (which can control angle(s) or speed(s) (e.g., in tracked or skid-steer embodiments, etc.) of the steering element(s), etc.) to control a heading of the power equipment machine (e.g., whether and/or the extent to which the power equipment machine will follow a curved path as it moves, etc.). In various embodiments, a current heading of the power equipment machine can be determined via one or more heading controllers, wherein the heading controller(s) can comprise wheel position encoder(s) 124 or control unit 150, and can be based on wheel angle data from wheel position encoder(s) 124, speed data from speed sensor(s) 140 (e.g., in some tracked or skid steer embodiments), and/or external location data, etc. The heading of the power equipment machine can be straight (which can correspond to the center angle of steerable wheel(s) 122 discussed above) or can curve clockwise or counterclockwise to a greater or lesser extent (e.g., which can be mapped to wheel angular displacements other than the center angle, with greater curving corresponding to a larger magnitude of wheel angular displacement). In such embodiments, steering motor(s) 128 can be driven by steering motor controller(s) 126 to control the steering element(s) such that the heading of the power equipment machine aligns with a target heading that corresponds to the control angular displacement of steering interface 122. Although the exact manner in which the steering element(s) are controlled will vary between embodiments, the alignment with a target heading is similar to how steering motor(s) 128 can be driven by steering motor controller(s) 126 to control steerable wheel(s) 122 in order to align the wheel angular displacement with a target wheel angular displacement that corresponds to the control angular displacement of steering interface 122

Figure 2:
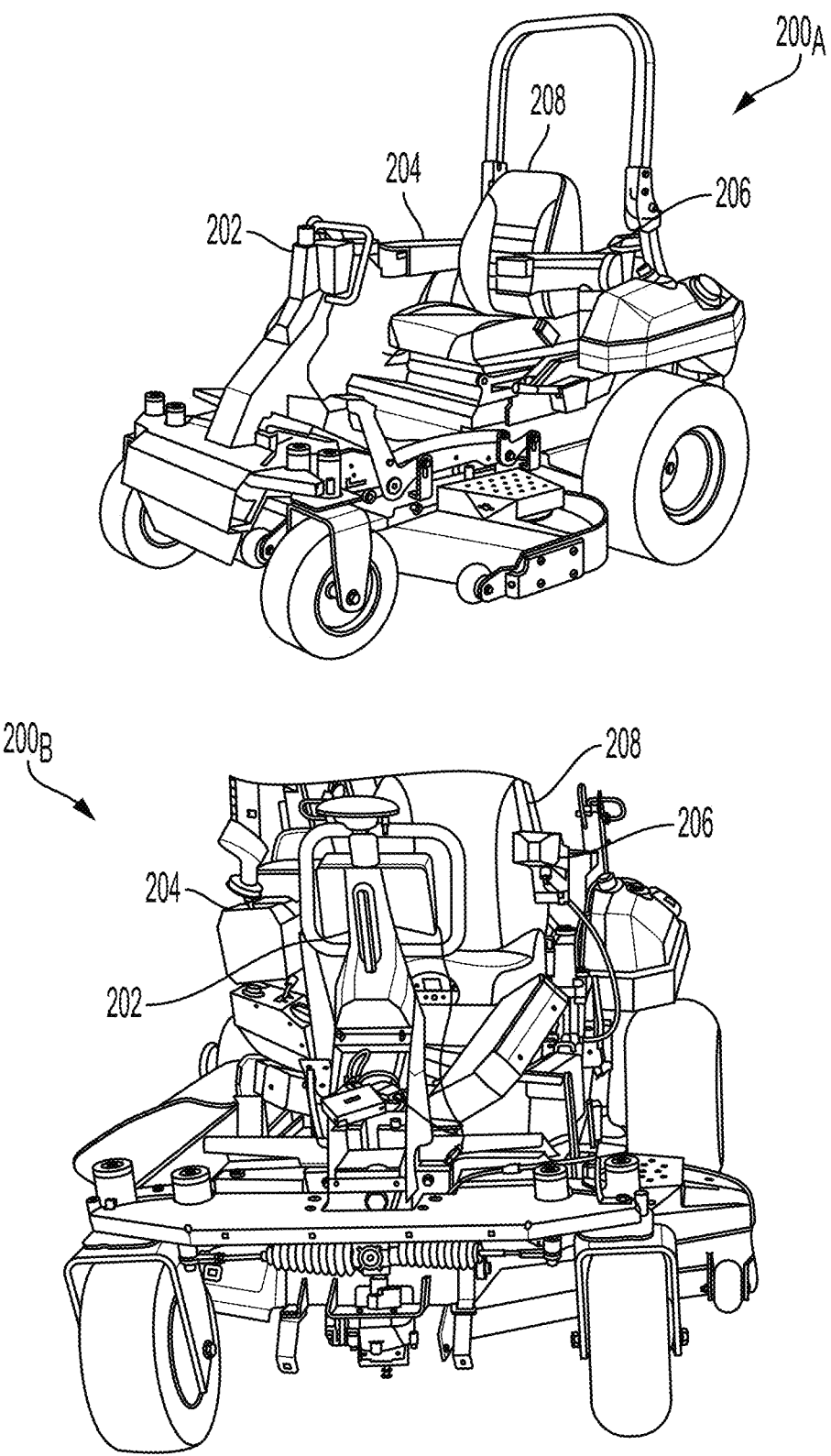
FIG. 2 depicts images of first and second example embodiments of a power equipment machine according to embodiments of the present disclosure.

Referring to FIG. 2, depicted are two images showing a first example power equipment machine $200_A$ and a second example power equipment machine $200_B$. according to one or more embodiments of the present disclosure. Power equipment machines $200_A$ and $200_B$ can be configured to operate in a manual operating mode, in which a user controls drive and steering interfaces of power equipment machines $200_A$ and $200_B$ and can be configured to operate in an autonomous or semi-autonomous operating mode, in which a processing device coupled with position location equipment operates the steering interfaces of power equipment machine $200_A$ or $200_B$.

In various embodiments, power equipment machine $200_A$ or $200_B$ includes movable arms 204, 206 (e.g., armrests, as one non-limiting example) configured to rest in multiple positions relative to a user position 208. In at least one embodiment, movable arms 204, 206 can be adjustable such that one or more of the multiple rest positions can be adjusted by a user of power equipment machine $200_A/200_B$. As one example, the multiple positions can include an open position facilitating user ingress to or egress from user position 208 (e.g., see FIG. 3, below). As another example, the multiple positions can include a closed position facilitating physically securing a user within user position 208 (e.g., see FIG. 4, below). Moreover, the closed position can be configured to position manual steering interfaces of power equipment machine $200_A/200_B$ and autonomous guidance controls of power equipment machine $200_A/200_B$, positioned on the movable arms 204, 206, at the hands of a user located at user position 208.

A graphical display 202 is also provided. Graphical display 202 can be electronically and communicatively connected with a control device or control unit (not depicted, but see FIG. 1, above and FIG. 10, below) of power equipment machine $200_A/200_B$. Graphical display 202 can serve as a user input/output interface to view, define, modify, etc., functions of power equipment machine $200_A/200_B$, such as: drive-by-wire steering system functions, operational functions, geographical boundary definition functions, pathing guidance functions, geographic boundary management functions, fuel conservation functions, settings of the control device, electrical or mechanical settings of power equipment machine $200_A/200_B$, or the like, or a suitable combination of the foregoing.

Figure 3:
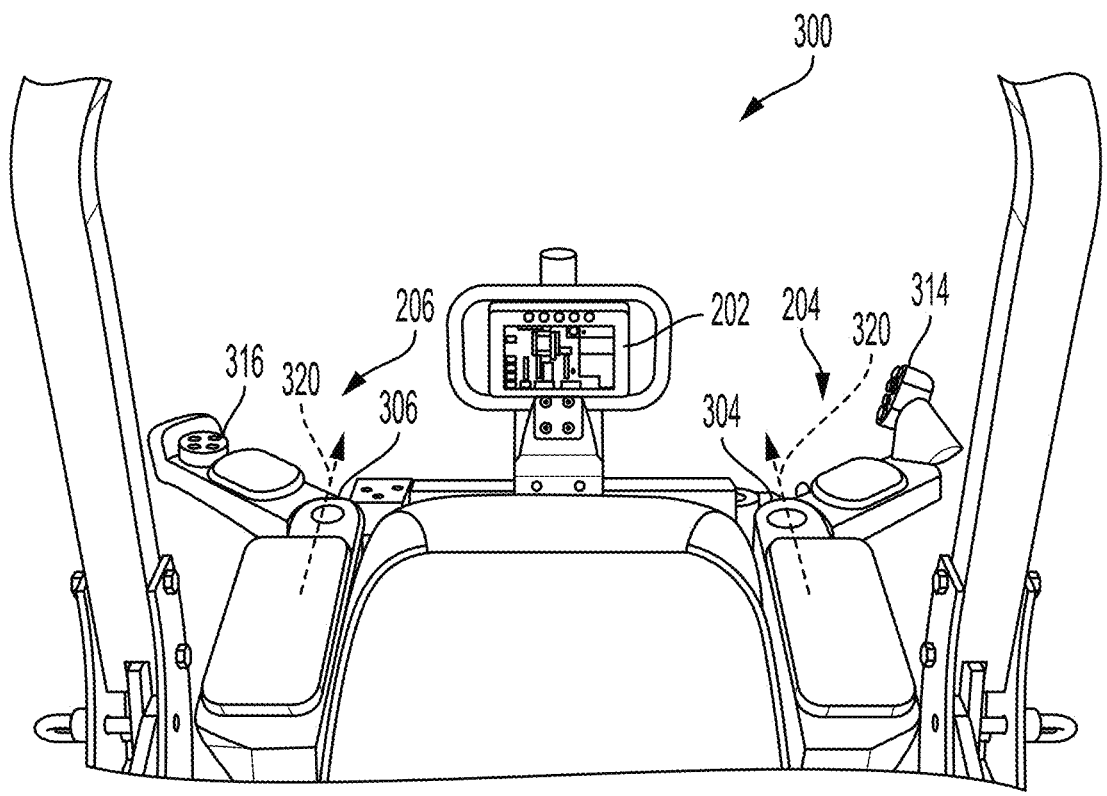
FIG. 3 illustrates a picture of the first example power equipment machine of FIG. 2 with movable armrest devices and graphical display, in additional embodiments.

Referring to FIG. 3, there is depicted another view 300 of power equipment machine $200_A$ according to additional embodiments of the present disclosure. Although not shown in FIGS. 3-9, power equipment machine $200_B$ can have similar features to those described herein. Movable arms 204, 206 will be referred to individually as right movable arm 204 and left movable arm 206. In the embodiment illustrated by view 300, movable arms 204, 206 pivot about rotation points 304 and 306, respectively. When rotated fully away from user position 208 (e.g., as illustrated in view 300) movable arms 204, 206 can be in the open position facilitating user ingress to or egress from user position 208. When rotated fully into and in front of user position 208 (e.g., see FIG. 4, below) movable arms 204, 206 can be in the closed position physically securing a user within user position 208.

In at least one embodiment, rotation points 304, 306 can include tensioning components (e.g., mechanical tensioning component(s), a spring, tension rod, or other device for storing/applying elastic potential energy) configured to cause movable arms 204, 206 to move to one or more of the multiple rest positions from another (non-rest) position. For instance, the tensioning components can cause a movable arm 204, 206 to move to the open position or to the closed position when between such positions. In another embodiment, the tensioning components can cause a movable arm 204, 206 to move to either the open position or to the closed position when between such positions and beyond a threshold position that is between the open position and the closed position. As a specific example, the threshold position can be straight outward (e.g., along dotted arrows 320) from a rear (fixed) portion of a movable arm 204, 206 near to user position 208 and opposite rotation points 304, 306 along movable arms 204, 206 from manual steering interfaces 316 (e.g., which can be employed as steering interface system 110) and autonomous guidance controls 314. Alternatively, the threshold position can be approximately straight outward from the rear portion (e.g., within one to five degrees rotation of rotation points 304, 306 from the straight outward direction 320). When a movable arm 204, 206 is moved beyond the threshold position (e.g., in a direction of the open position), the tensioning components can impose a force to move the movable arm 204, 206 to the open position. In another embodiment, when the movable arm 204, 206 is moved beyond the threshold position (e.g., in a direction of the closed position), the tensioning components can impose a force to move the movable arm 204, 206 to the closed position. In still another embodiment, tensioning components can be provided to effect multiple threshold positions: a first threshold position beyond which rotation of movable arm 204, 206 results in a force to move the movable arm 204, 206 to the closed position, and a second threshold position beyond which rotation of movable arm 204, 206 results in a second force to move the movable arm 204, 206 to the open position.

In the embodiment(s) illustrated by image 300, manual steering interfaces 316 are provided near an end of movable arm 206, although other embodiments can position manual steering interfaces 316 at different locations on power equipment machine $200_A/200_B$. Manual steering interfaces 316 include a rotational wheel or jogwheel (e.g., employable as steering interface 112), sensor or other system (e.g., Hall effect sensor, etc.) configured to generate a signal based on the angle or change/thereof of the rotational wheel or jogwheel, and digital encoder (e.g., employable as steering interface position encoder 114) configured to send a rotational steering angle signal to one of a power steering system (e.g., power steering system 120) or steering interface device (e.g., control unit 150, computer 1302 of FIG. 13, etc.) configured to convert the rotational steering angle signal to a change in direction of power equipment machine $200_A/200_B$. The change in direction can be represented by a change in orientation of steerable wheels (e.g., front wheels, etc.) of power equipment machine $200_A/200_B$ calibrated to the rotational steering angle signal, can be represented by a change in relative speed(s) of drive wheels (e.g., rear wheels, etc.) of power equipment machine $200_A/200_B$ calibrated to the rotational steering angle signal, or other suitable mechanism for controlling orientation of power equipment machine $200_A/200_B$ on a surface. In a further embodiment, the change in direction is implemented by one or more electric motors in response to an output from the steering interface device, and mechanically independent from movement of manual steering interfaces 316. This enables manual steering interfaces 316 to be rotatable with much less force than that provided (by the electric motor(s)) to effect physical control over the turning of power equipment machine $200_A/200_B$.

Autonomous guidance controls 314 are positioned near an end of movable arm 204, though the present disclosure is not limited to this example placement of autonomous guidance controls 314, and other embodiments can position such controls elsewhere on power equipment machine $200_A/200_B$. In the embodiment illustrated by image 300, autonomous guidance controls 314 and manual steering interfaces 316 are moved toward a front-center placement with respect to user position 208, along movable armrests 204, 206. A user's hands can therefore naturally rest at manual steering interfaces 316 and autonomous guidance controls 314 when the user's arms are resting on movable arms 204, 206.

Figure 4:
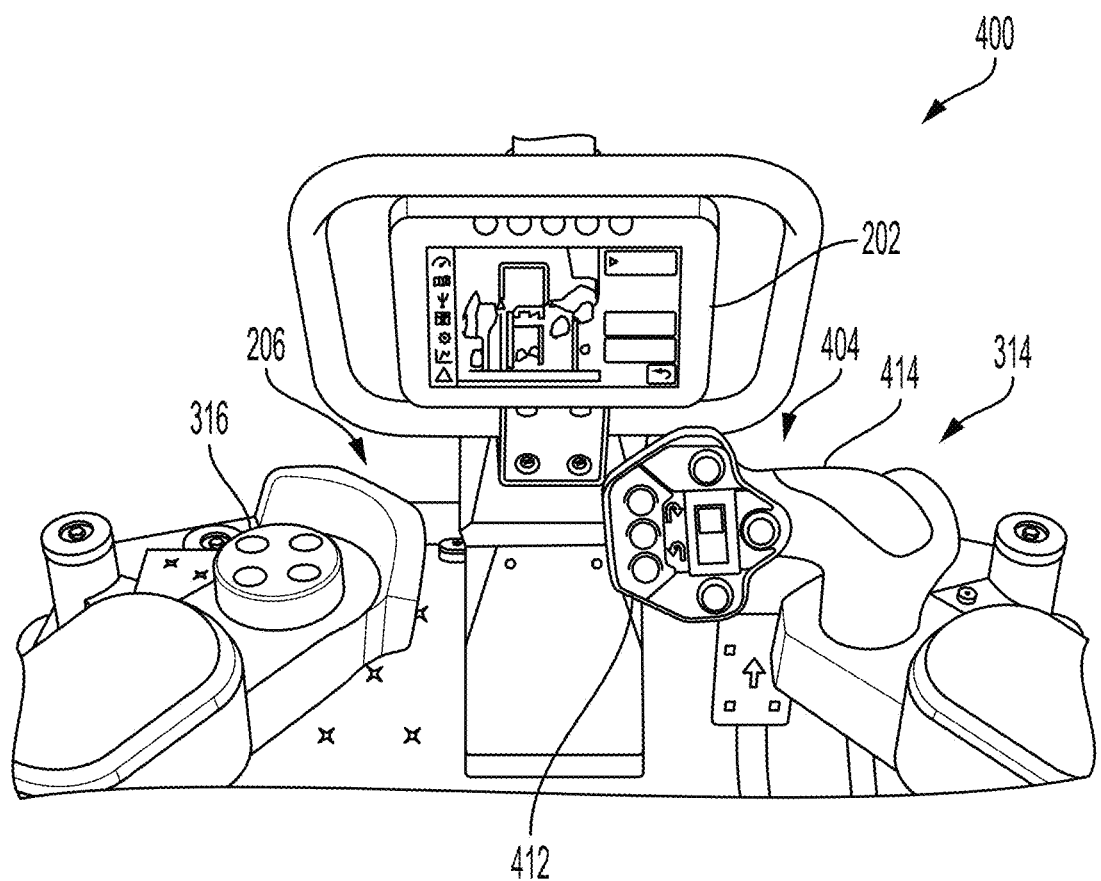
FIG. 4 depicts an image of the first example power equipment machine of FIG. 2 with movable armrest devices in a closed position, in another embodiment(s).

FIG. 4 depicts a further example image 400 of movable arms 204, 206 of power equipment machine $200_A$ in an example closed position physically securing the user. Additionally, the example closed position places manual steering interfaces 316 and autonomous guidance controls 314 at a vicinity of a user's hands, when the user's arms are resting on movable arms 204, 206. In the embodiment(s) illustrated with image 400, autonomous guidance controls 314 are formed as an ergonomic module 404 configured to be comfortable within a user's hand, when the user's arm is resting on movable arm 204. Ergonomic module 404 includes a formed surface 414 designed to comfortably support a palm of a human hand in a resting position, and a control panel 412 positioned at a resting position of a human thumb when the human hand is comfortably supported by formed surface 414. This allows the thumb to naturally engage with user input devices (pictured as buttons and rocker switch, but can include other switches, sliders, dials, and so forth) of autonomous guidance controls 314, minimizing or avoiding user fatigue when operating power equipment machine $200_A/200_B$. Additionally, manual steering interfaces 316 are positioned where a user's second hand naturally rests when the user's second arm is resting on movable arm 206. As mentioned above, manual steering interfaces 316 can be operated independent of the pressure or force required to mechanically operate a steering mechanism of power equipment machine $200_A/200_B$, and in an embodiment manual steering interfaces 316 can be operated with very low pressure or force configured to minimize or avoid fatigue to the user's second hand. As a result, manual steering interfaces 316 are configured to further minimize or avoid user fatigue when operating power equipment machine $200_A/200_B$.

Figure 5:
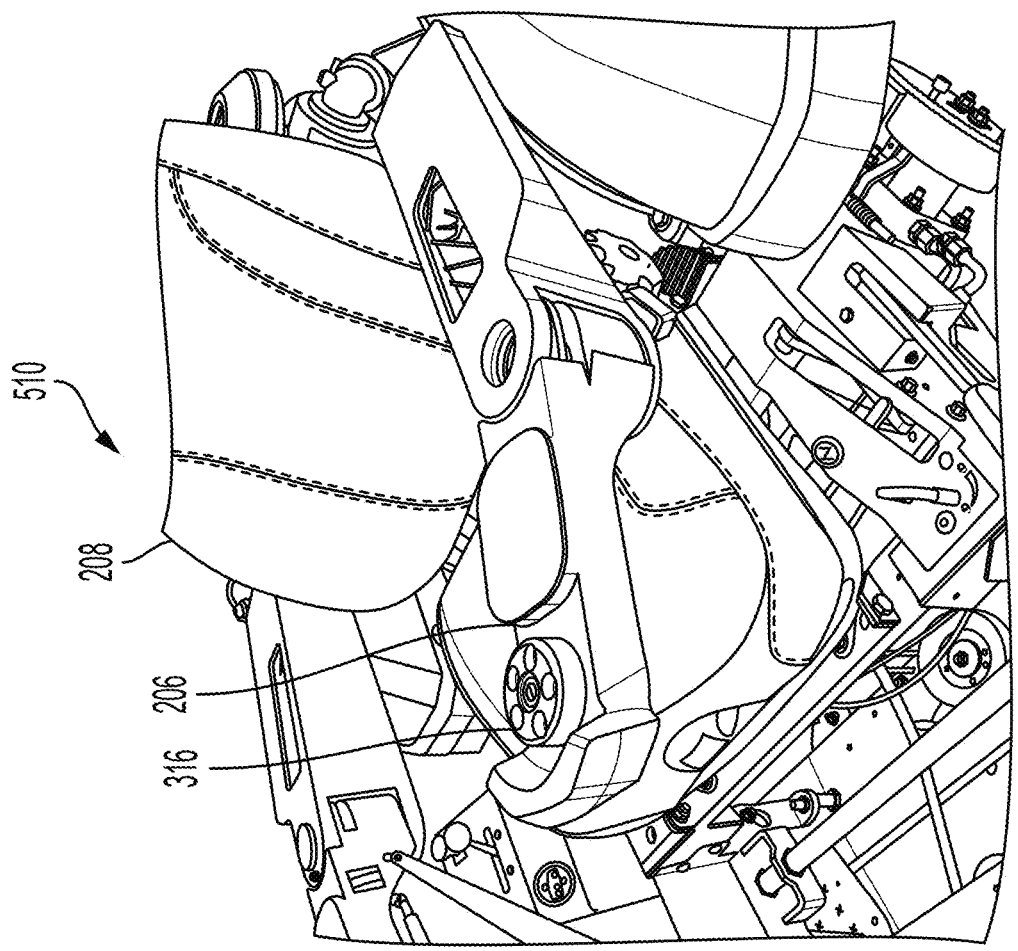
FIG. 5 illustrates additional details of movable arm with manual steering interfaces of a prototype of the first example embodiment power equipment machine.
Figure 5:
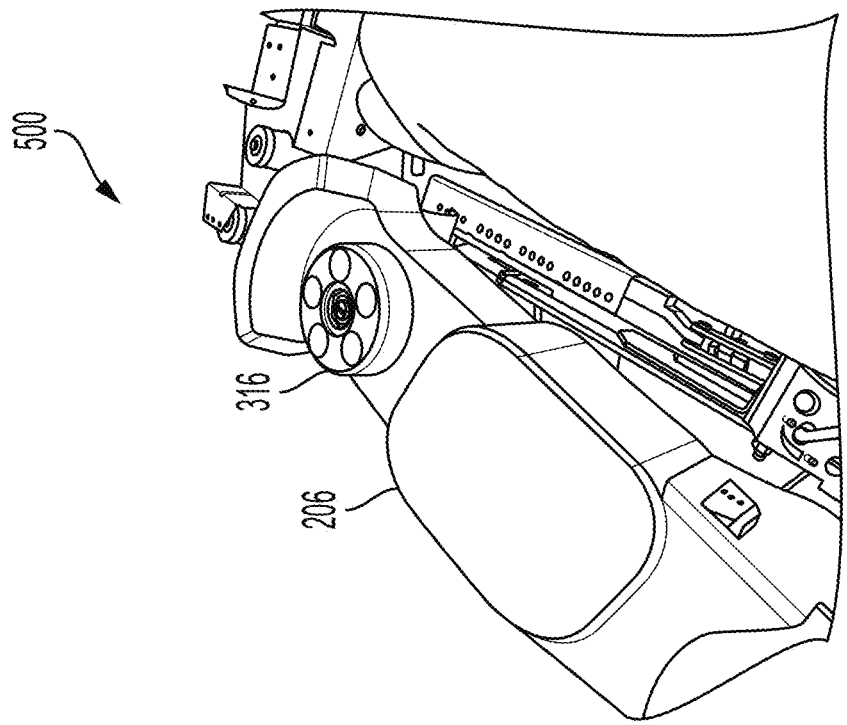

FIG. 5 illustrates additional details of movable arm 206 in connection with images 500 and 510 of a prototype embodiment of power equipment machine $200_A$. As can be seen in FIG. 5, the specific design of the manual steering interfaces 316 can vary between embodiments, with FIG. 5 showing an embodiment of manual steering interfaces 316 having a different number of contoured depressions than that shown in FIGS. 3-4.

Figure 6:
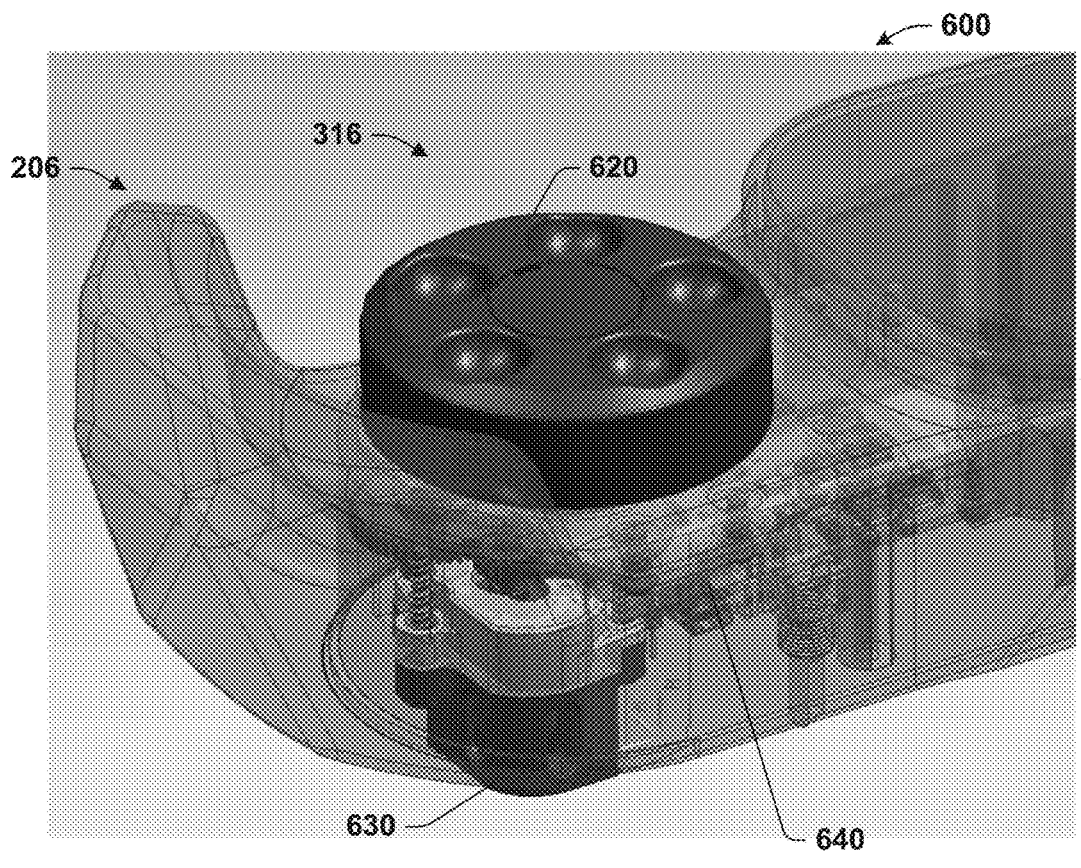
FIG. 6 illustrates multiple cut-away views of a movable arm and components of a first embodiment of manual steering interfaces of a power equipment machine, according to various aspects discussed herein.
Figure 6:
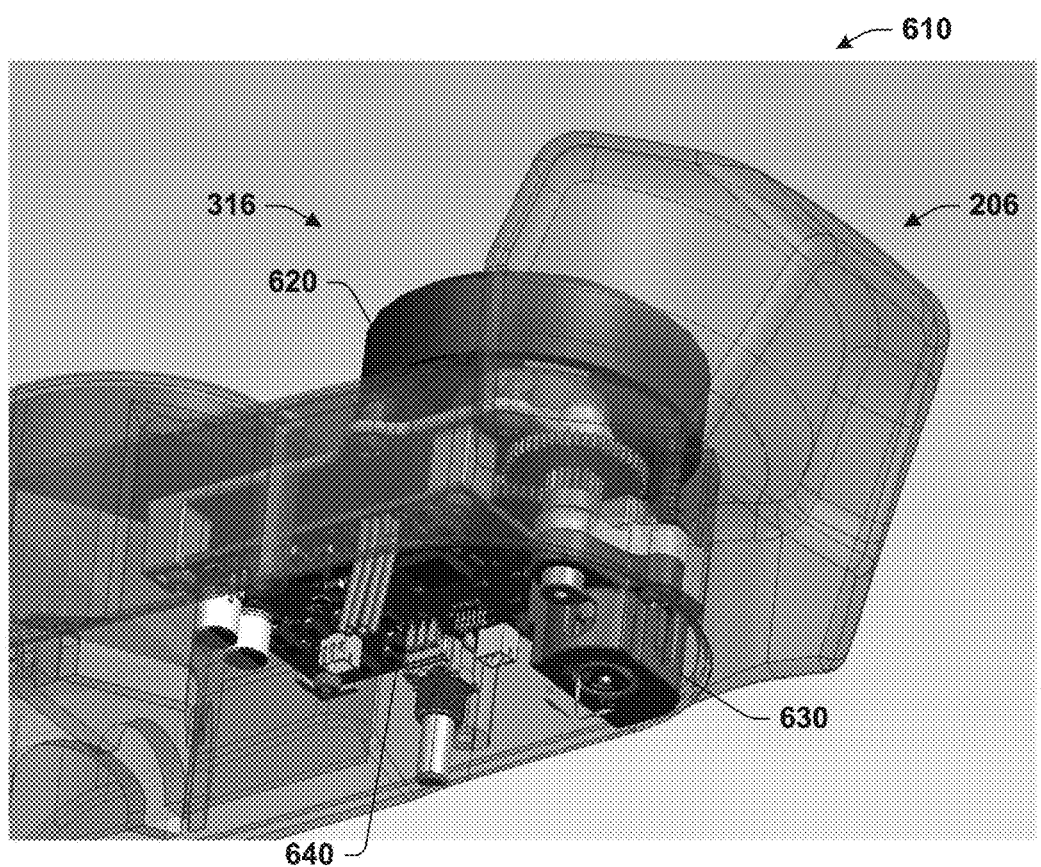
Figure 7:
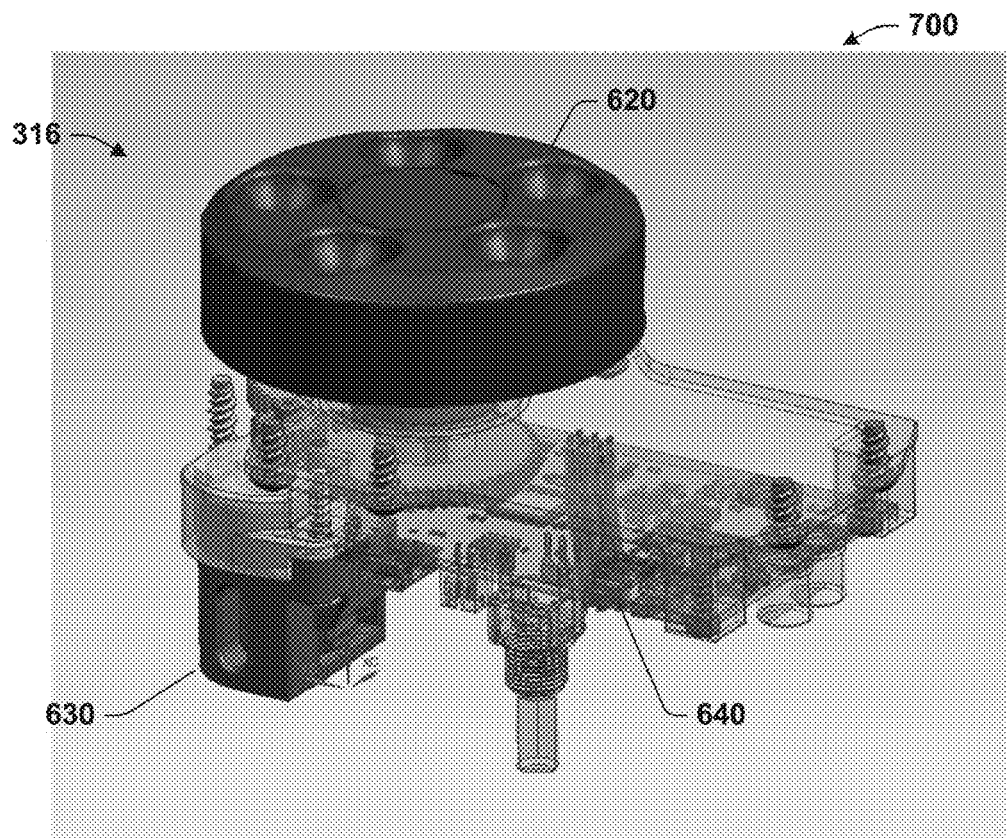
FIG. 7 depicts multiple views of components of the manual steering interfaces embodiment depicted in FIG. 6.
Figure 7:
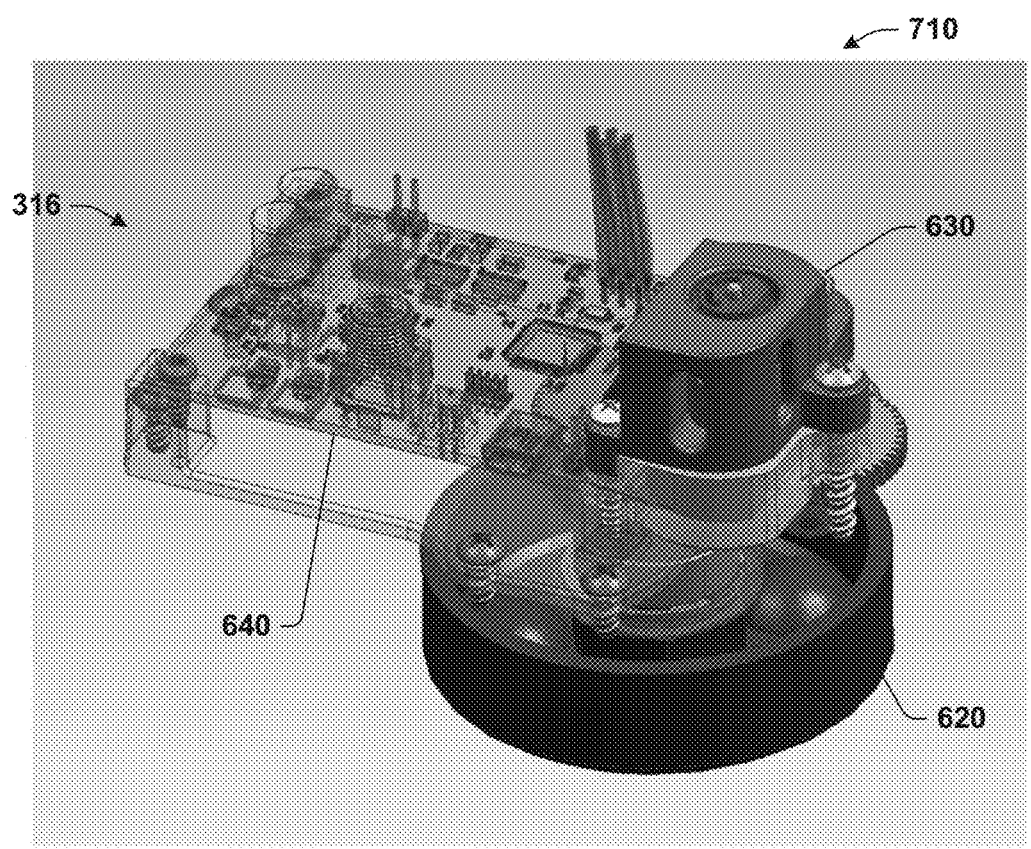
Figure 8:
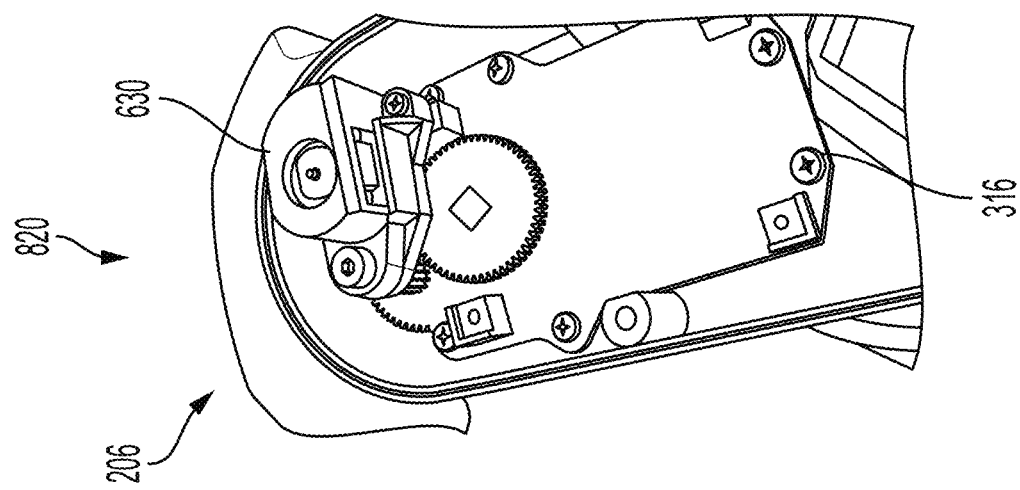
FIG. 8 illustrates images of prototype manual steering interfaces and associated components for the embodiment depicted in FIG. 6.
Figure 8:
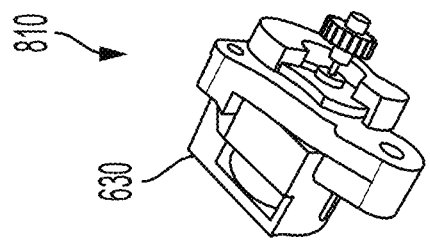
Figure 8:
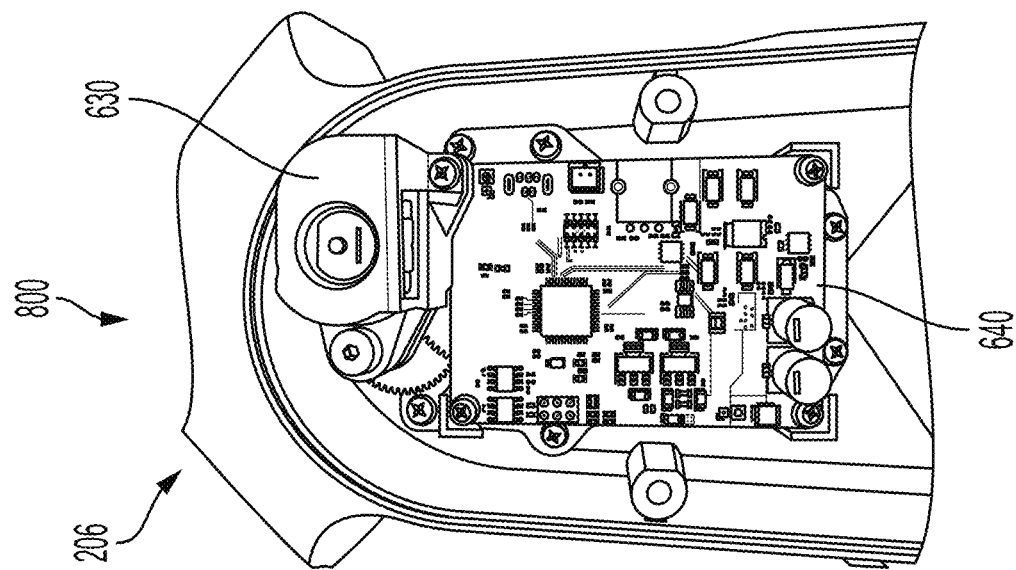

Referring to FIG. 6, illustrated are top and bottom perspective images 600 and 610, respectively, showing a cutaway view of movable arm 206 and components of a first embodiment of manual steering interfaces 316. Referring to FIG. 7, illustrated are top and bottom perspective images 700 and 710 showing components of the first embodiment of manual steering interfaces 316. Manual steering interfaces 316 comprise both electrical and mechanical components that are mechanically coupled to each other. The electrical components of manual steering interfaces 316 can be comprised in a single Printed Circuit Board Assembly (PCBA) 640, and can comprise a wheel encoder sensor (e.g., employable as steering interface position encoder 114), motor controller (e.g., employable as steering interface motor controller 116), and CAN bus communication interface. The mechanical components comprise a jogwheel interface 620 (e.g., employable as steering interface 112), feedback motor 630 (e.g., employable as steering interface motor 118), and gear reduction between feedback motor 630 and jogwheel interface 620 (the gearing reduction is 10:1 in the first embodiment, although greater or lesser gearing ratios can be employed in various embodiments). In FIGS. 6 and 7, the shaft of feedback motor 630 is parallel to the rotational axis of jogwheel interface 620. FIG. 8 illustrates images 800, 810, and 820 of a prototype of the first embodiment of manual steering interfaces 316 and components thereof.

In various embodiments, jogwheel interface 620 can be textured or constructed of material to facilitate user gripping or slowing via friction of jogwheel interface 620 (e.g., in some embodiments, it can be constructed of a material that facilitates gripping/slowing via friction, and can have a uniform circular outer edge to facilitate ease of gripping/ slowing via friction, etc.). For example, an inner portion of jogwheel interface 620 can be constructed of a rigid material (e.g., plastic, metal, etc.) for durability, but jogwheel interface 620 can additionally comprise a softer outer material (e.g., rubber, etc.) that improves user ability to grip jogwheel interface 620 or provide friction to counter one or more torques such as simulated caster effect torque, etc. Alternatively, the entirety of jogwheel interface 620 can be constructed of a rigid material, but an outer surface can be textured or made of suitable material to improve user ability to grip jogwheel interface 620 or provide friction to counter one or more torques.

Figure 9:
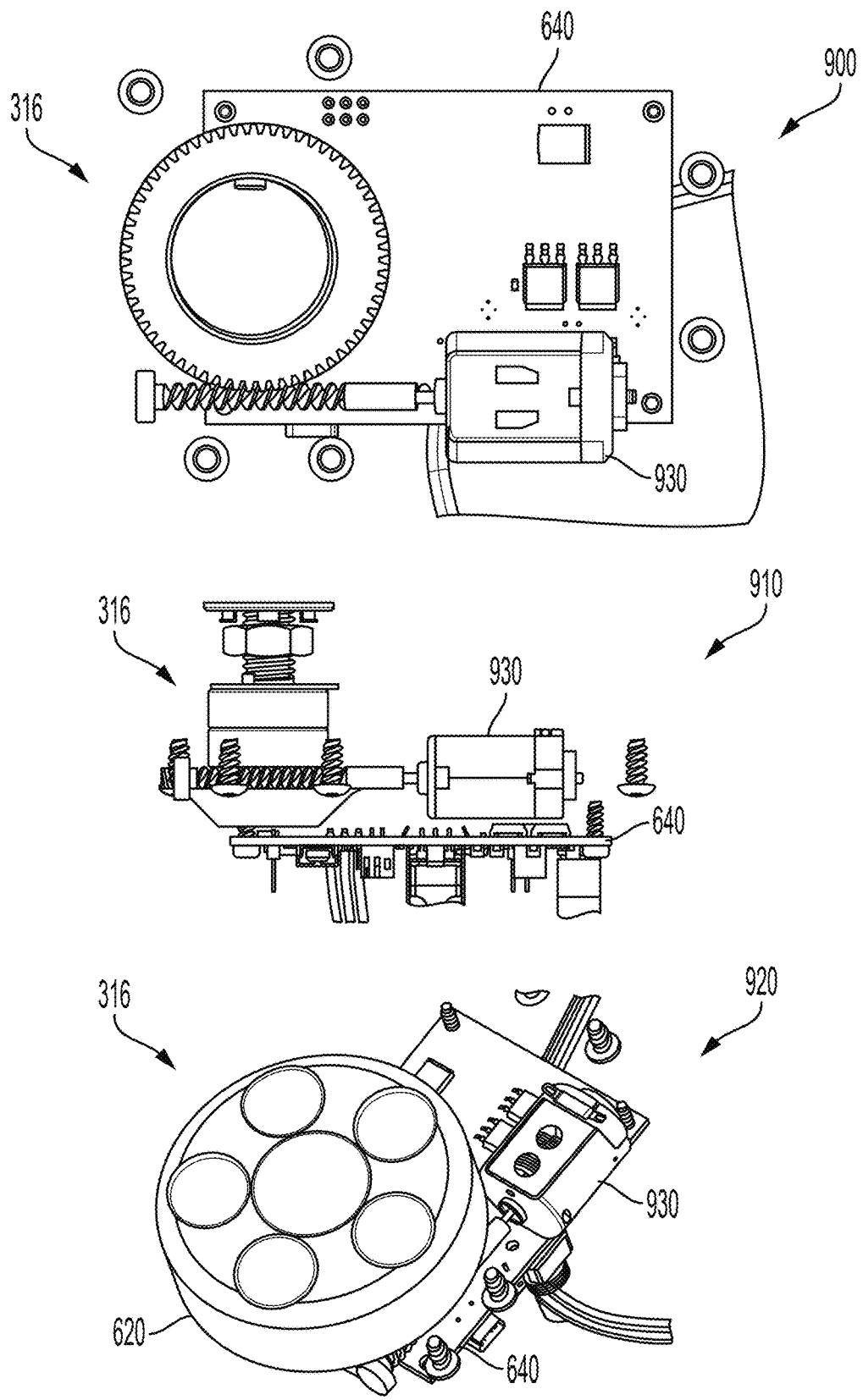
FIG. 9 depicts multiple images of a second embodiment of manual steering interfaces of a power equipment machine, according to various aspects discussed herein.

Referring to FIG. 9, illustrated are top, side, and perspective images 900, 910, and 920, respectively, showing components of a second embodiment of manual steering interfaces 316. The second embodiment of manual steering interfaces can be similar to the first embodiment of manual steering interfaces, but can comprise feedback motor 930, which can have its shaft aligned perpendicular to the rotational axis of jogwheel interface 620, instead of feedback motor 630, which has its shaft aligned parallel to the rotational axis of jogwheel interface 620.

Figure 10:
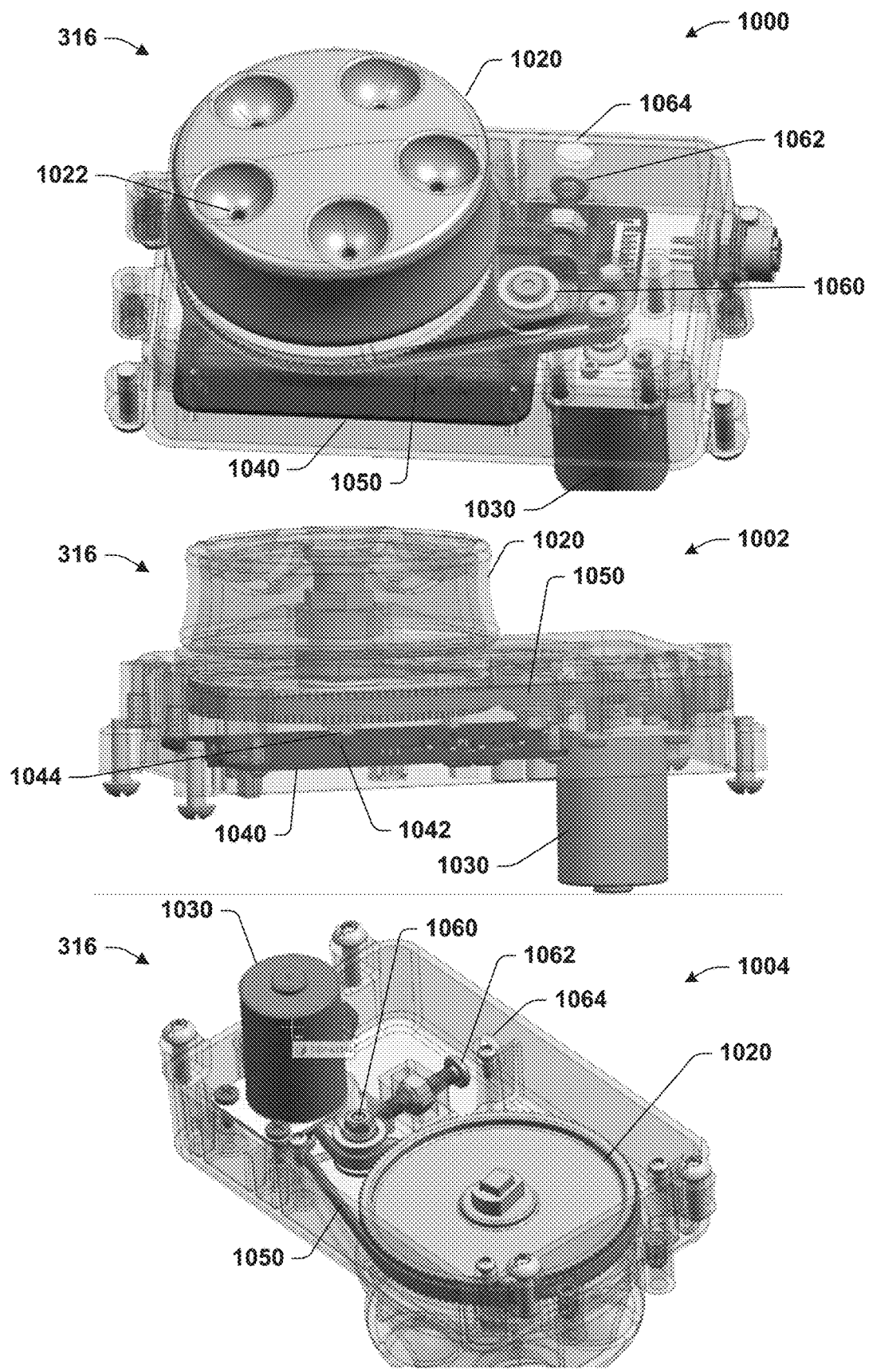
FIG. 10 depicts multiple images of a third embodiment of manual steering interfaces of a power equipment machine, according to various aspects discussed herein.
Figure 11:
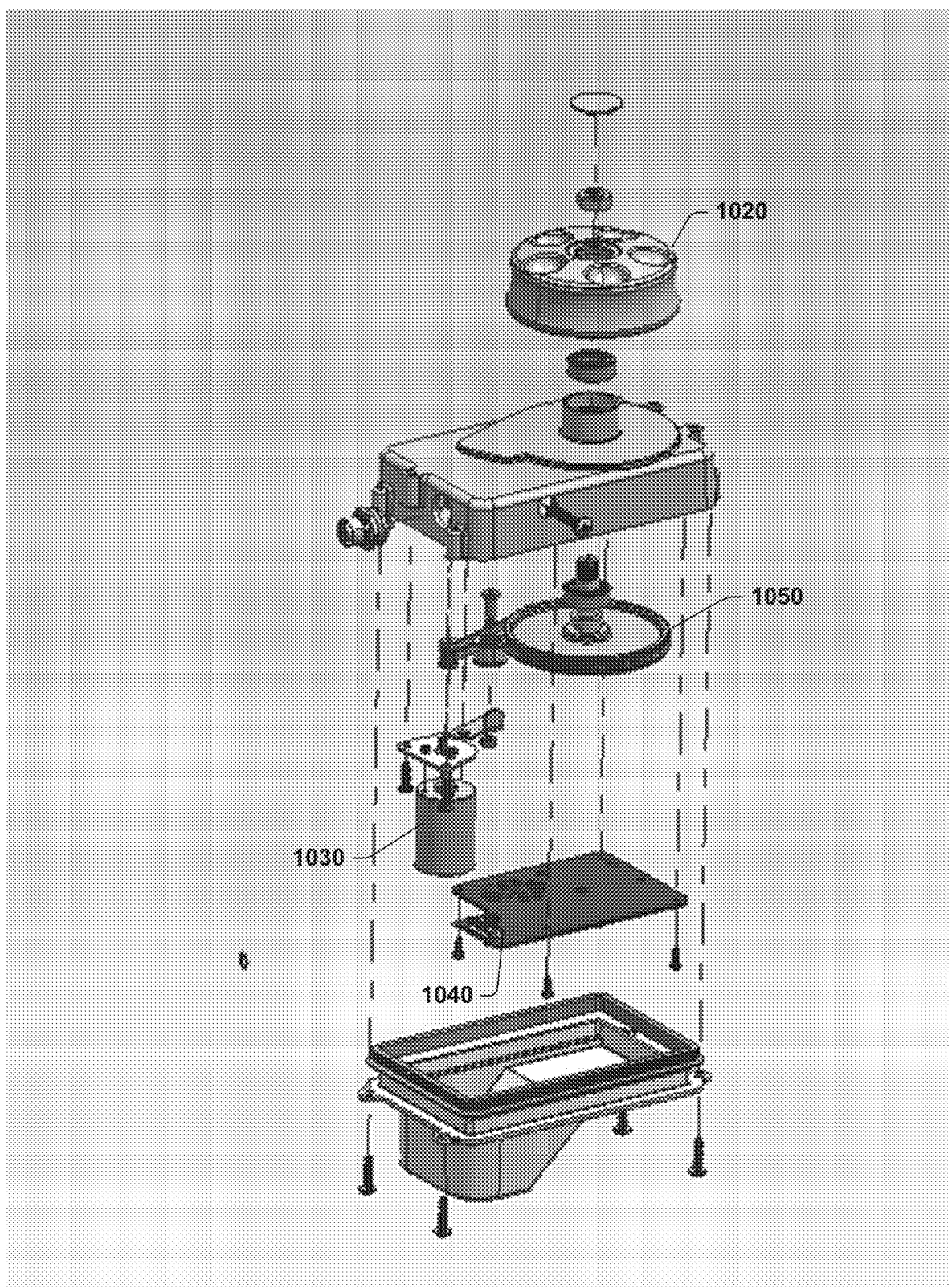
FIG. 11 depicts an exploded view of the third embodiment of manual steering interfaces of a power equipment machine, according to various aspects discussed herein.

Referring to FIG. 10, illustrated are top perspective, side, and bottom perspective images 1000, 1002, and 1004, respectively, showing components of a third embodiment of manual steering interfaces 316, in connection with various aspects discussed herein. Referring to FIG. 11, illustrated is an exploded view of the third embodiment of manual steering interfaces 316, in connection with various aspects discussed herein. The third embodiment of manual steering interfaces can be similar to the first and second embodiments of manual steering interfaces. However, the third embodiment can comprise feedback motor 1030, which can have its shaft aligned parallel to but offset from the rotational axis of jogwheel interface 1020, and coupled via a timing belt 1050, instead of feedback motor 630, which has its shaft aligned parallel to the rotational axis of jogwheel interface 620 and coupled via a spur gear, or feedback motor 930, with a shaft perpendicular to the rotational axis of jogwheel interface 620 and coupled via a helical gear. Tensioner 1060 can be included also coupled to timing belt 1050, and changes in its position can be used to control the tension in timing belt 1050. A tensioning bolt (or screw, etc.) 1062 can be included to adjust the position of tensioner 1060, and manual adjustment of tensioning bolt (screw, etc.) 1062 can be accomplished by a user via access port 1064.

Additionally, image 1000 shows drain holes 1022 at the bottom of the detents that can provide for drainage of fluid (e.g., rainwater, etc.) through jogwheel interface 1020 and off power equipment machine $200_A/200_B$. In various embodiments, the detents can extend near, but not all of the way to, the outer edge of jogwheel interface 1020, to provide a uniform outer edge of jogwheel interface 1020, which can facilitate a user applying pressure via a hand to slow rotation of jogwheel interface 1020 via friction.

Image 1002 also shows Hall effect sensor 1042, which can be on PCBA 1040 and aligned along the axis of jogwheel interface 1020 near a magnet 1044 mounted on jogwheel interface 1020, to sense changes in the angle of magnet 1044 (and thereby sense changes in the angle of jogwheel interface 1020).

Figure 12:
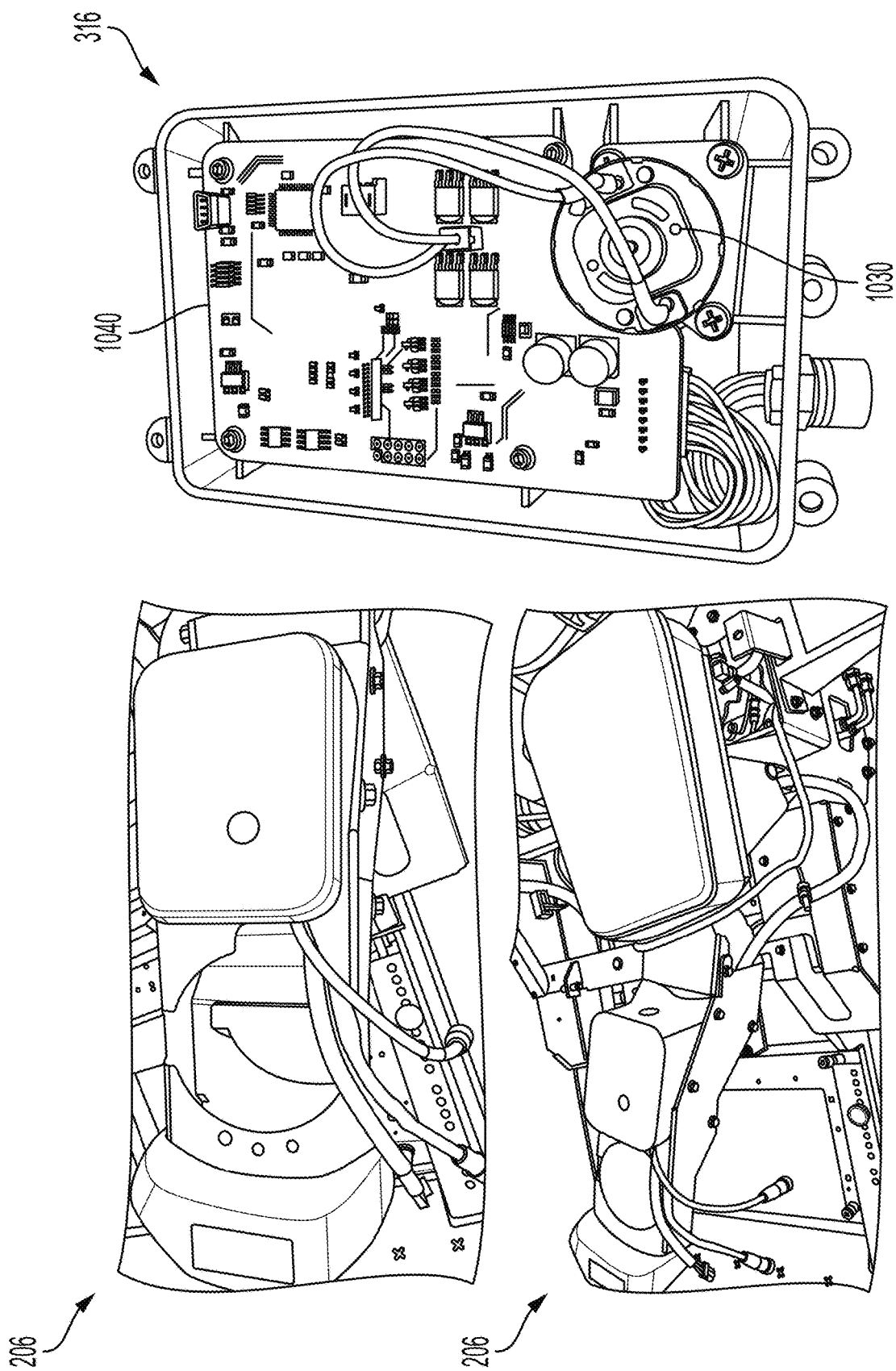
FIG. 12 depicts images of a movable armrest of the second example power equipment machine of FIG. 2 (without manual steering interfaces) and a bottom view of a prototype of the third embodiment of manual steering interfaces, in connection with various aspects discussed herein.

Referring to FIG. 12, illustrated are two images (left) of movable armrest 206 of a prototype of power equipment machine $200_B$ (without manual steering interfaces 316) and a bottom view of a prototype of the third embodiment of manual steering interfaces 316, in connection with various aspects discussed herein.

Figure 13:
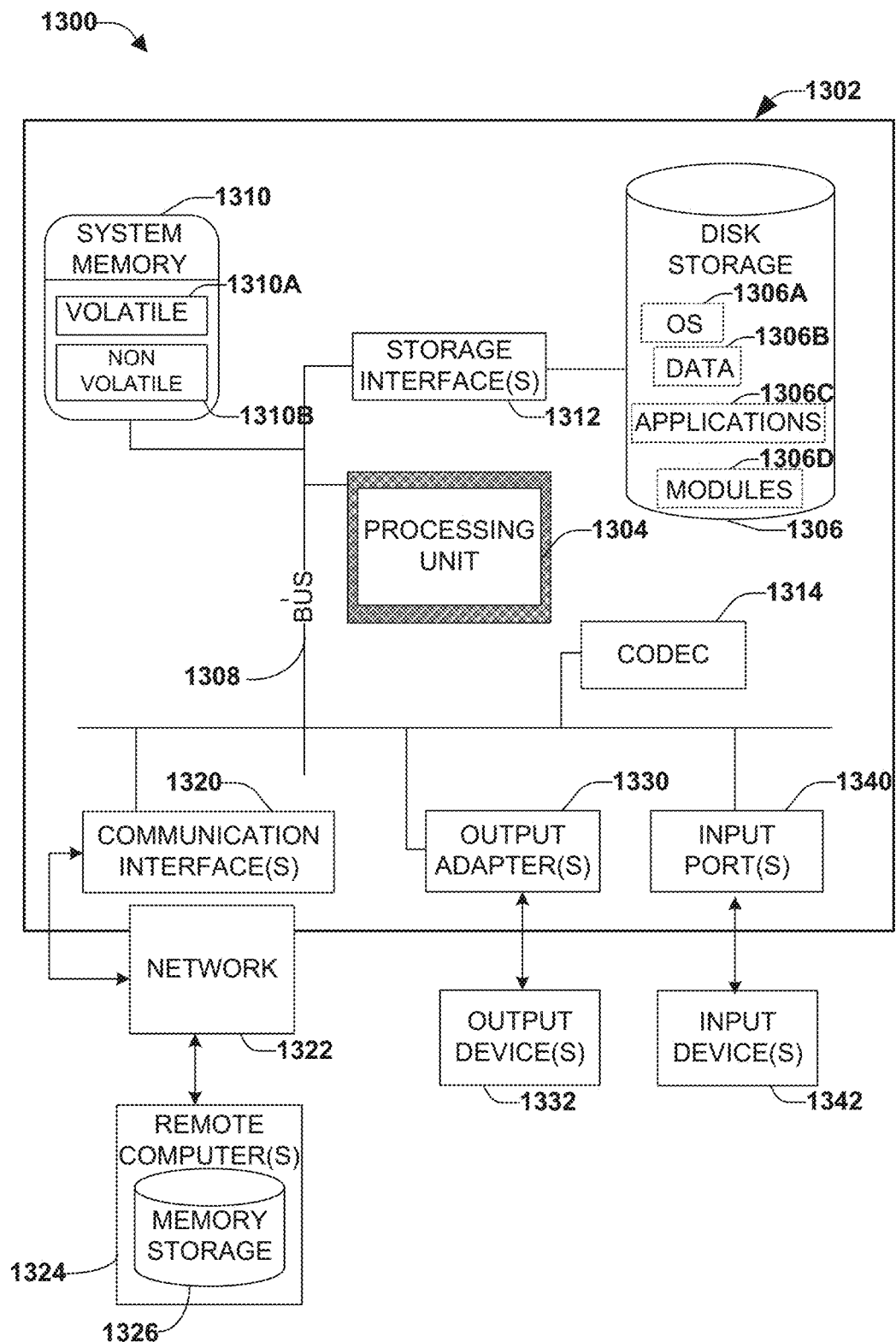
FIG. 13 depicts a diagram of an example computing environment for electronic and data management and computer control for a power equipment machine, in an embodiment.

In connection with FIG. 13, the systems and processes described herein can be embodied within hardware, such as a single integrated circuit (IC) chip, multiple ICs, an application specific integrated circuit (ASIC), or the like. A suitable operating environment 1300 for implementing various aspects of the claimed subject matter includes a computer 1302. In various embodiments, a control unit (e.g., control unit 150, etc.) of a power equipment machine can be embodied in part by computer 1302, or an analogous computing device known in the art, subsequently developed, or made known to one of ordinary skill in the art by way of the context provided herein.

The computer 1302 includes a processing unit 1304, a system memory 1310, a codec 1314, and a system bus 1308. The system bus 1308 couples system components including, but not limited to, the system memory 1310 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1310 can include volatile memory 1310A, non-volatile memory 1310B, or both. Functions of a control unit (among other control units: 150, etc., depicted herein) described in the present specification can be programmed to system memory 1310, in various embodiments. The basic input/output system (BIOS), containing the basic routines to transfer information between elements within the computer 1302, such as during start-up, is stored in non-volatile memory 1310B. In addition, according to present innovations, codec 1314 may include at least one of an encoder or decoder, wherein the at least one of an encoder or decoder may consist of hardware, software, or a combination of hardware and software. Although, codec 1314 is depicted as a separate component, codec 1314 may be contained within non-volatile memory 1310B. By way of illustration, and not limitation, non-volatile memory 1310B can include read only memory (ROM), programmable ROM (PROM), electrically programmable ROM (EPROM), electrically erasable programmable ROM (EEPROM), or Flash memory. Non-volatile memory 1310B can be embedded memory (e.g., physically integrated with computer 1302 or a mainboard thereof), or removable memory. Examples of suitable removable memory can include a secure digital (SD) card, a compact Flash (CF) card, a universal serial bus (USB) memory stick, or the like. Volatile memory 1310A includes random access memory (RAM), which can serve as operational system memory for applications executed by processing unit 1304. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), and so forth.

Computer 1302 may also include removable/non-removable, volatile/non-volatile computer storage medium. FIG. 13 illustrates, for example, disk storage 1306. Disk storage 1306 includes, but is not limited to, devices such as a magnetic disk drive, solid state disk (SSD) floppy disk drive, tape drive, Flash memory card, memory stick, or the like. In addition, disk storage 1306 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 1306 to the system bus 1308, a removable or non-removable interface is typically used, such as interface 1312. In one or more embodiments, disk storage 1306 can be limited to solid state non-volatile storage memory, providing motion and vibration resistance for a control unit (e.g., control unit 112, among others) operable in conjunction with a power equipment machine (e.g., power equipment machine 102, etc.).

It is to be appreciated that FIG. 13 describes software that can program computer 1302 to operate as an intermediary between a user of a power equipment machine (e.g., power equipment machine 200, and others), or operate as an intermediary between the power equipment machine and an autonomous steering system (or partially autonomous, user-assisted steering system) for operating the power equipment machine embodied within operating environment 1300. Such software includes an operating system 1306A. Operating system 1306A, which can be stored on disk storage 1306, acts to control and allocate resources of the computer 1302. Applications 1306C take advantage of the management of resources by operating system 1306A through program modules 1006D, and program data 1306B, such as the boot/shutdown transaction table and the like, stored either in system memory 1310 or on disk storage 1306. It is to be appreciated that the claimed subject matter can be implemented with various operating systems or combinations of operating systems.

Input device(s) 1342 connects to the processing unit 1304 and facilitates user interaction with operating environment 1300 through the system bus 1308 via interface port(s) 1330. Input port(s) 1340 can include, for example, a serial port, a parallel port, a game port, a universal serial bus (USB), among others. Output device(s) 1332 use some of the same type of ports as input device(s) 1342. Thus, for example, a USB port may be used to provide input to computer 1302 and to output information from computer 1302 to an output device 1332. Output adapter 1330 is provided to illustrate that there are some output devices, such as graphic display, speakers, and printers, among other output devices, which require special adapters. The output adapter 1330 can include, by way of illustration and not limitation, video and sound cards that provide a means of connection between the output device 1332 and the system bus 1308. It should be noted that other devices or systems of devices provide both input and output capabilities such as remote computer(s) 1324 and memory storage 1326.

Computer 1302 can operate in conjunction with one or more electronic devices described herein. For instance, computer 1302 can embody a power equipment control unit 150 configured to operate steering interface system 120 and a motor to provide autonomous or semi-autonomous driving (including autonomous turning), as described herein. Additionally, computer 1302 can communicatively couple with steering interface system 110 to suspend driving of steering interface motor 118 from providing various torques to steering interface 112 during autonomous and/or semi-autonomous driving, as well as to end autonomous and/or semi-autonomous operation and return to a manual mode in response to certain inputs from steering interface 112.

Communication connection(s) 1320 refers to the hardware/software employed to connect the network interface 1322 to the system bus 1308. While communication connection 1320 is shown for illustrative clarity inside computer 1302, it can also be external to computer 1302. The hardware/software necessary for connection to the network interface 1322 includes, for exemplary purposes only, internal and external technologies such as, modems including regular telephone grade modems, cable modems and DSL modems, ISDN adapters, and wired and wireless Ethernet cards, hubs, and routers.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A drive-by-wire steering system for a power equipment machine, comprising:
    a steering interface system comprising:
        a steering interface configured to receive rotational input from a user;
        a steering interface position encoder configured to determine a control angular displacement of the steering interface relative to a center angle of the steering interface;
        a steering interface motor configured to rotate the steering interface; and
        a steering interface motor controller configured to control activation of the steering interface motor to apply one or more torques to the steering interface;
    a power steering system comprising:
        one or more steerable wheels;
        one or more steering position encoders configured to determine a wheel angular displacement of the one or more steerable wheels relative to a center angle of the one or more steerable wheels;
        one or more steering motors configured to turn the one or more steerable wheels;
        one or more steering motor controllers configured to control activation of the one or more steering motors to turn the one or more steerable wheels toward a target wheel angular displacement, wherein the target wheel angular displacement is the control angular displacement divided by a steering ratio,
    wherein the steering interface system and the power steering system communicate via a communication link, wherein the communication link is one of a wired communication link or a wireless communication link; and
    wherein, in response to the target wheel angular displacement exceeding a maximum wheel angle of the one or more steerable wheels, the steering interface position encoder is configured to redefine the center angle of the steering interface such that the control angular displacement becomes the maximum wheel angle multiplied by the steering ratio.

2. The drive-by-wire steering system of claim 1, wherein the one or more torques comprise a first torque, wherein the first torque has a constant magnitude that is applied in opposition to the rotational input.

3. The drive-by-wire steering system of claim 1, wherein the one or more torques comprise a second torque, wherein the second torque is applied in response to the target wheel angular displacement equaling or exceeding the maximum wheel angle.

4. The drive-by-wire steering system of claim 1, wherein the one or more torques comprise a third torque, wherein the third torque is applied in response to a difference between the wheel angular displacement and the target wheel angular displacement exceeding a threshold.

5. The drive-by-wire steering system of claim 1, wherein the one or more torques comprise a third torque, wherein the third torque is applied in response to the control angular displacement being non-zero and the power equipment machine being in motion.

6. The drive-by-wire steering system of claim 5, further comprising one or more speed sensors configured to measure a ground speed of the power equipment machine, wherein a magnitude of the third torque depends on the ground speed of the power equipment machine.

7. The drive-by-wire steering system of claim 5, wherein the magnitude of the third torque depends on a magnitude of the control angular displacement.

8. The drive-by-wire steering system of claim 1, wherein the steering interface motor controller is configured to apply braking to the steering interface via the steering interface motor in response to the power equipment machine being in one of an autonomous mode or a semi-autonomous mode.

9. The drive-by-wire steering system of claim 1, wherein, in response to the power equipment machine entering a manual mode from one of an autonomous mode or a semi-autonomous mode, the steering interface position encoder is configured to redefine the center angle of the steering interface such that the control angular displacement becomes the wheel angular displacement multiplied by the steering ratio.

10. The drive-by-wire steering system of claim 1, wherein the communication link is a Controller Area Network (CAN) bus.

11. The drive-by-wire steering system of claim 1, wherein the steering interface position encoder is configured to determine the control angular displacement based on a signal from a Hall effect sensor.

12. The drive-by-wire steering system of claim 1, wherein the steering interface motor is configured to rotate the steering interface via a timing belt that couples the steering interface motor to the steering interface.

13. A steering interface system, comprising:
    a steering interface configured to receive rotational input from a user;
    a steering interface position encoder configured to determine a control angular displacement of the steering interface relative to a center angle of the steering interface;
    a steering interface motor configured to rotate the steering interface;
    a steering interface motor controller configured to control activation of the steering interface motor to apply one or more torques to the steering interface; and
    a communication interface configured to output first data that indicates the control angular displacement and receive second data that indicates a heading of a power equipment machine; wherein:
    the one or more torques comprise a maximum heading torque; and
    in response to a magnitude of the control angular displacement exceeding the product of a steering ratio and a maximum magnitude for the heading:
        the maximum heading torque is applied, and
        the steering interface position encoder is configured to redefine the center angle of the steering interface such that the control angular displacement becomes the product of the steering ratio and the maximum magnitude for the wheel angular displacement.

14. The steering interface system of claim 13, wherein the one or more torques comprise a first torque, wherein the first torque has a constant magnitude that is applied in opposition to the rotational input.

15. The steering interface system of claim 13, wherein the one or more torques comprise a third torque, wherein the third torque is applied in response to a difference between the heading and a target heading exceeding a threshold, wherein the target wheel angular displacement is the control angular displacement divided by a steering ratio.

16. The steering interface system of claim 13, wherein the communication interface is further configured to receive third data that indicates a ground speed, wherein the one or more torques comprise a third torque, and wherein the third torque is applied in response to the control angular displacement being non-zero and the ground speed being non-zero.

17. The steering interface system of claim 16, wherein a magnitude of the third torque depends on the ground speed.

18. The steering interface system of claim 16, wherein the magnitude of the third torque depends on a magnitude of the control angular displacement.

19. The steering interface system of claim 13, wherein the steering interface position encoder is configured to determine the control angular displacement based on a signal from a Hall effect sensor.

20. The steering interface system of claim 13, wherein the steering interface motor is configured to rotate the steering interface via a timing belt that couples the steering interface motor to the steering interface.

21. A power equipment machine, comprising:
a steering interface system comprising:
    a steering interface configured to receive rotational input from a user;
    a steering interface position encoder configured to determine a control angular displacement of the steering interface relative to a center angle of the steering interface;
    a steering interface motor configured to rotate the steering interface; and
    a steering interface motor controller configured to control activation of the steering interface motor to apply one or more torques to the steering interface;
a power steering system comprising:
    one or more steering elements configured to control a heading of the power equipment machine;
    one or more heading controllers configured to determine the heading of the power equipment machine relative to a center angle of the heading;
    one or more steering motors configured to cause the one or more steering elements to change the heading;
    one or more steering motor controllers configured to control activation of the one or more steering motors to cause the one or more steering elements to change the heading to a target heading, wherein the target heading is determined based on the control angular displacement and a steering ratio; and
a Controller Area Network (CAN) bus that facilitates communication between the steering interface system and the power steering system;
wherein, in response to the target heading exceeding a maximum magnitude for the heading of the power equipment machine, the steering interface position encoder is configured to redefine the center angle of the steering interface such that the control angular displacement becomes the maximum magnitude for the heading multiplied by the steering ratio.

22. The power equipment machine of claim 21, wherein the one or more torques comprise a simulated caster effect torque.

23. The power equipment machine of claim 21, wherein the steering interface position encoder is configured to determine the control angular displacement based on a signal from a Hall effect sensor.

24. The power equipment machine of claim 21, wherein the steering interface motor is configured to rotate the steering interface via a timing belt that couples the steering interface motor to the steering interface.

* * * * *